US009626731B2

United States Patent
Takasaka

(10) Patent No.: US 9,626,731 B2
(45) Date of Patent: Apr. 18, 2017

(54) IMAGE PROCESSING APPARATUS AND IMAGE PROCESSING METHOD THAT CALCULATE A NUMBER OF PIXELS, REQUIRED FOR OUTPUTTING A SIZE OF AN OUTPUT IMAGE, ACCORDING TO OBTAINED PROCESSING PARAMETERS AND A PREDETERMINED PROCESSING ORDER

(71) Applicant: CANON KABUSHIKI KAISHA, Tokyo (JP)

(72) Inventor: Michiaki Takasaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 556 days.

(21) Appl. No.: 14/011,903

(22) Filed: Aug. 28, 2013

(65) Prior Publication Data
US 2014/0064640 A1    Mar. 6, 2014

(30) Foreign Application Priority Data

Aug. 31, 2012   (JP) ................................. 2012-191434

(51) Int. Cl.
*G06T 1/20* (2006.01)
(52) U.S. Cl.
CPC ..................... *G06T 1/20* (2013.01)
(58) Field of Classification Search
None
See application file for complete search history.

(56) References Cited

U.S. PATENT DOCUMENTS

| 5,848,189 A * | 12/1998 | Pearson .............. B41F 33/0036 382/141 |
| 8,243,100 B2 * | 8/2012 | Krithivasan .............. G06F 7/48 345/649 |
| 2003/0086616 A1 * | 5/2003 | Oh ........................ G03F 9/7076 382/209 |
| 2003/0179199 A1 * | 9/2003 | Deering .................. G06T 11/40 345/427 |
| 2004/0170325 A1 * | 9/2004 | Eichhorn ........... G06K 9/00147 382/205 |
| 2006/0056739 A1 * | 3/2006 | Sato ......................... G06T 1/20 382/307 |
| 2006/0078226 A1 * | 4/2006 | Zhou ..................... G06T 3/0018 382/298 |
| 2008/0018650 A1 * | 1/2008 | Sander .................... G06T 15/40 345/441 |
| 2009/0147111 A1 * | 6/2009 | Litvinov ............... G06T 3/4015 348/273 |

(Continued)

FOREIGN PATENT DOCUMENTS

JP    H07-325800 A    12/1995
JP    2012-027901 A    2/2000

(Continued)

*Primary Examiner* — Joni Richer
(74) *Attorney, Agent, or Firm* — Canon U.S.A., Inc. IP Division

(57) ABSTRACT

Input amount calculation processing and output amount calculation processing corresponding to each processing module are defined. The input amount calculation processing and the output amount calculation processing are performed in a processing order (a reverse order to the processing order) to obtain a favorable peripheral pixel amount.

32 Claims, 18 Drawing Sheets

(56) References Cited

U.S. PATENT DOCUMENTS

| | | | |
|---|---|---|---|
| 2009/0256848 A1* | 10/2009 | Iourcha | G06T 5/00 345/522 |
| 2010/0235609 A1* | 9/2010 | Inoue | G06F 15/17375 712/29 |
| 2012/0177111 A1* | 7/2012 | Narroschke | H04N 19/117 375/240.12 |

FOREIGN PATENT DOCUMENTS

| | | |
|---|---|---|
| JP | P2000-354168 A | 12/2000 |
| JP | 2006-115447 A | 4/2006 |
| JP | 2010-287175 A | 12/2010 |

* cited by examiner

FIG.4

| | | |
|---|---|---|
| ID OF PROCESSING MODULE B | ◄------ | ZEROTH |
| ID OF PROCESSING MODULE C | ◄------ | FIRST |
| ID OF PROCESSING MODULE D | ◄------ | SECOND |
| ID OF PROCESSING MODULE A | ◄------ | THIRD |
| 0 | | |
| 0 | | |

FIG.13A
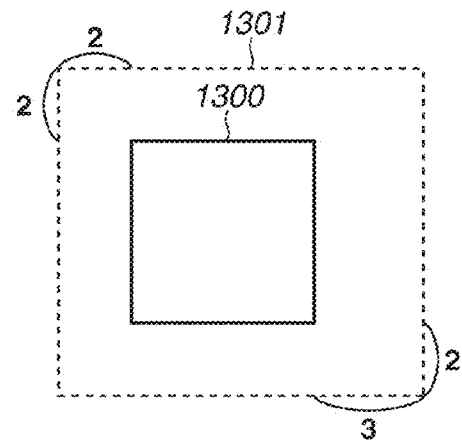
FIG.13B
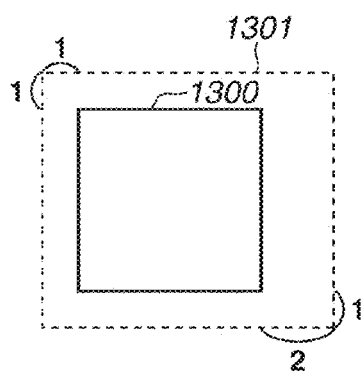
FIG.13C
A 
B 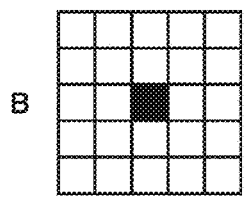
■ PIXEL OF INTEREST
□ PERIPHERAL PIXEL

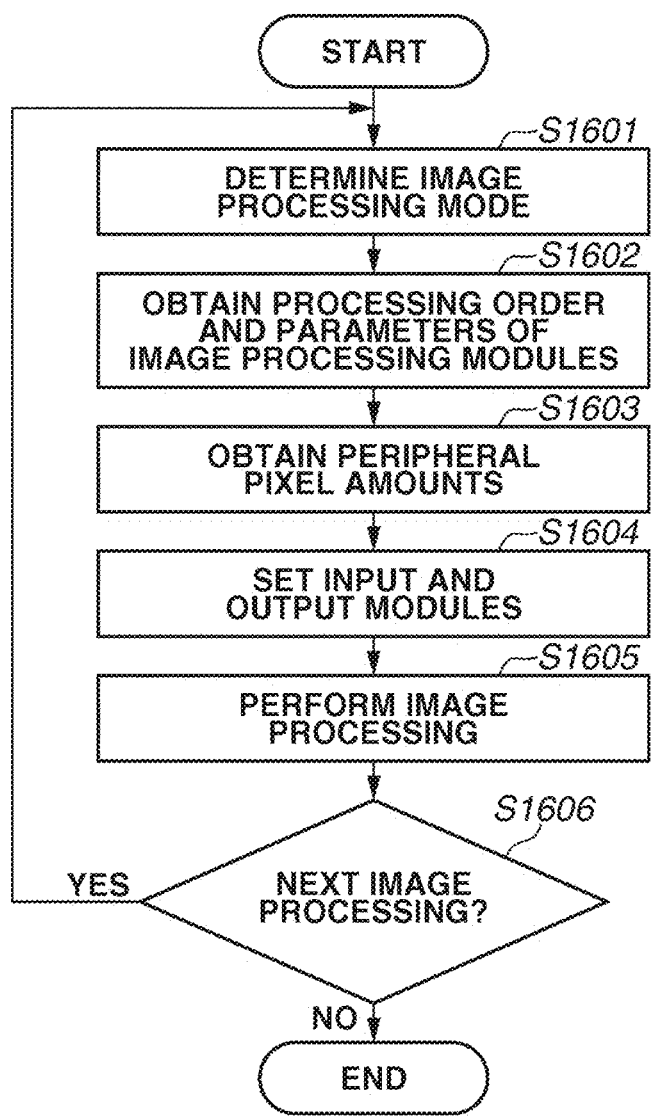

| MODE ID | PROCESSING ORDER | INPUT HEIGHT | OUTPUT HEIGHT |
|---|---|---|---|
| 1 | B → C → D → A | 30 | — |
| 2 | B → D → A | — | 40 |
| 3 | B → D → C → D → A | 20 | — |
| 4 | D →A,B→ C → D | — | 50 |

| MODULE | CALCULATING PROGRAM ID |
|---|---|
| A | 1 |
| B | 2 |
| C | 3 |
| D | 4 |

PROGRAM 1

1801  1802  1803

IMAGE PROCESSING APPARATUS AND IMAGE PROCESSING METHOD THAT CALCULATE A NUMBER OF PIXELS, REQUIRED FOR OUTPUTTING A SIZE OF AN OUTPUT IMAGE, ACCORDING TO OBTAINED PROCESSING PARAMETERS AND A PREDETERMINED PROCESSING ORDER

BACKGROUND OF THE INVENTION

Field of the Invention

The present invention relates to an image processing apparatus and an image processing method.

Description of the Related Art

Processing an image may include calculation of a pixel value of a pixel in a position to be output (pixel of interest). Such image processing may sometimes need pixels values of the pixel of interest and a plurality of peripheral pixels. For example, 3×3 median filter processing needs the pixel values of one or more peripheral pixels on each of the top, bottom, right, and left (in such an example, eight peripheral pixels) of a pixel of interest (in such an example, a pixel in the center). When the image processing needing peripheral pixels is performed with an image end as a pixel of interest, as many dummy pixels as necessary are added to the input image as peripheral pixels, or the filter processing fails to provide a favorable output value.

Japanese Laid-Open Patent Application No. 2000-354168 discusses that when filter processes are combined, the amounts of peripheral pixels needed for respective image processing modules in a vertical direction and a horizontal direction are added to determine the amounts of peripheral pixels to be added to an input image.

Japanese Laid-Open Patent Application No. 7-325800 discusses a method for connecting processing circuits using a ring-shaped bus (ring bus). According to such a method, when a plurality of processing circuits performs pipeline processing, the processing circuits can be permutated in a processing order.

The technique discussed in Japanese Laid-Open Patent Application No. 2000-354168 is difficult to simply apply to the technique discussed in Japanese Laid-Open Patent Application No. 7-325800. More specifically, the amounts of peripheral pixels to be added to an input image are difficult to efficiently determine by simply adding the numbers of peripheral pixels needed for the respective image processing modules by the technique discussed in Japanese Laid-Open Patent Application No. 2000-354168. The reason is that if a ring bus like that discussed in Japanese Laid-Open Patent Application No. 7-325800 is used to configure the image processing modules so that the processing order can be changed, the numbers of peripheral pixels to be added vary depending on whether a scaling (enlargement or reduction) module and/or a module having a restriction about units of processing is/are used before or after an image processing module that uses peripheral pixels.

SUMMARY OF THE INVENTION

According to one aspect of the present invention, an image processing apparatus includes a parallel processing unit configured to include a plurality of image processing modules, an obtaining unit configured to obtain a peripheral pixel amount needed by image processing of the plurality of image processing modules based on a reverse order to a processing order of the plurality of image processing modules, and an input unit configured to supply an input image to the parallel processing unit based on the peripheral pixel amount obtained by the obtaining unit.

Further features of the present invention will become apparent from the following description of exemplary embodiments with reference to the attached drawings.

BRIEF DESCRIPTION OF THE DRAWINGS

FIG. 4 is a schematic diagram illustrating a processing order related to a plurality of image processing modules.

FIG. 13A is a schematic diagram illustrating peripheral pixel amounts determined by a conventional technique. FIG. 13B is a schematic diagram illustrating appropriate peripheral pixel amounts. FIG. 13C is a schematic diagram illustrating a pixel of interest and peripheral pixels.

FIG. 16 is a flowchart illustrating an outline of processing performed by the image processing apparatus.

DESCRIPTION OF THE EMBODIMENTS

Figure 1:
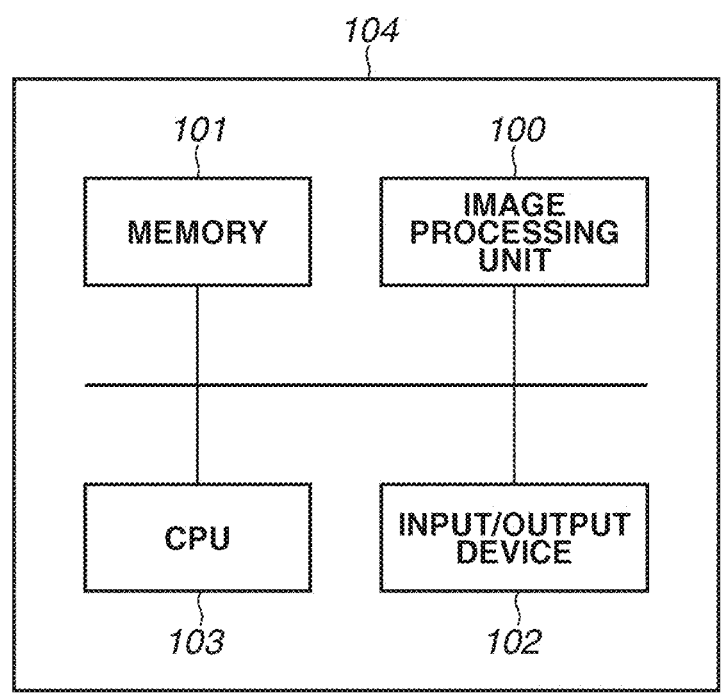
FIG. 1 is a block diagram illustrating a general configuration of an image processing apparatus.

The difficulty in simply applying the technique of the above-described Japanese Laid-Open Patent Application No. 2000-354168 to the technique discussed in Japanese Laid-Open Patent Application No. 7-325800 will be described further.

Suppose, for example, there is a plurality of image processing modules including an image processing module A, an image processing module B, and an image processing module C. As illustrated in FIG. 13C, the number of peripheral pixels (in the following description, referred to as peripheral pixel amount) of the image processing module A is one on the right end. The peripheral pixel amount of the image processing module B is two pixels on each of the top, bottom, left, and right ends. The image processing module C performs enlargement processing (simply doubles an input image) and the peripheral pixel amount is zero (not illustrated). Suppose that the image processing modules A to C perform image processing in order of A, C, and B and the peripheral pixel amounts are calculated based on the technique discussed in Japanese Laid-Open Patent Application No. 2000-354168. According to the technique discussed in Japanese Laid-Open Patent Application No. 2000-354168, the peripheral pixel amounts are determined by adding the numbers of peripheral pixels needed by the image processing modules A and B. More specifically, the numbers of dummy pixels 1301 to be added to an original image 1300 read from a memory are two on the top end, two on the bottom end, two on the left end, and three on the right end (see FIG. 13A).

However, the peripheral pixel amounts actually needed are different. If two peripheral pixels are added to each of the top, bottom, left, and right ends for the sake of the image processing module B, the peripheral pixels are also magnified by the enlargement processing of the image processing module C. Since two peripheral pixels are needed for the output of the image processing module C, the peripheral pixel amount at the time of input to the image processing module C can be one, which is determined by multiplying two by the reciprocal of the enlargement ratio in consideration of the enlargement processing of the image processing module C.

The peripheral pixel amount needed by the image processing module A is one on the right end. Consequently, the peripheral pixel amounts to be input to the image processing module A are one on the top end, one on the bottom end, one on the left end, and two on the right end (see FIG. 13B). Consideration thus needs to be given to the order in which a scaling (enlargement or reduction) module performs processing with respect to an image processing module or modules that need peripheral pixels.

Some image processing modules may be a tile processing module that performs processing in units of blocks (tiles) of K×L pixels. Such a module needs an input image size including an image height in multiples of L and an image width in multiples of K. For example, if a block processing size is 2×2 pixels, the image height and the image width need to be even numbers.

For example, with the above-described image processing modules A to C, suppose that the image processing module C also performs tile processing (area processing that needs no peripheral pixel, like edge detection processing) with the restriction that the input image size be even numbers. To input and process an image having an input image width of 90 pixels in the processing order of A, C, and B, the peripheral pixel amounts are retrospectively determined in reverse order to the processing order from an end-edge module as described above. The input image width is determined to be 93 pixels (the peripheral pixel amount needed on the left end, 1, + the input image size, 90, + the peripheral pixel amount needed on the right end, 2). However, in such a case, the width of the input image size including the needed right and left peripheral pixels input to the image processing module C turns out to be 91 pixels, which violates the restriction of the image processing module C.

Initially, the configuration of an image processing apparatus 104 according to a first exemplary embodiment of the present invention will be described with reference to FIG. 1. The image processing apparatus 104 includes an image processing unit 100, a memory 101, an input/output device 102, and a central processing unit (CPU) 103. The CPU 103 performs processing for implementing flowcharts to be described below, initializes the image processing unit 100, makes settings for causing the image processing unit 100 to perform various types of processing, and supplies image data to be processed to the image processing unit 100 based on programs stored in the memory 101. The CPU 103 further controls the image processing apparatus 104 to operate in any one of a plurality of processing modes (print, scan, copying, mail, facsimile (FAX), and direct print). Direct print refers to printing out an image or images stored in a detachable memory card without using control of a personal computer. The input/output device 102 transmits and receives data and commands to/from outside the image processing apparatus 104. For example, the input/output device 102 receives a scan image scanned by an external scanner and stores the scan image into the memory 101. The image processing unit 100 performs image processing on the scan image, and then the input/output device 102 transmits the processed image to an external output apparatus (printer, display, or projector) or the like. A direct memory access controller (DMAC), which is not illustrated, may be used to transfer data between the components.

Figure 2:
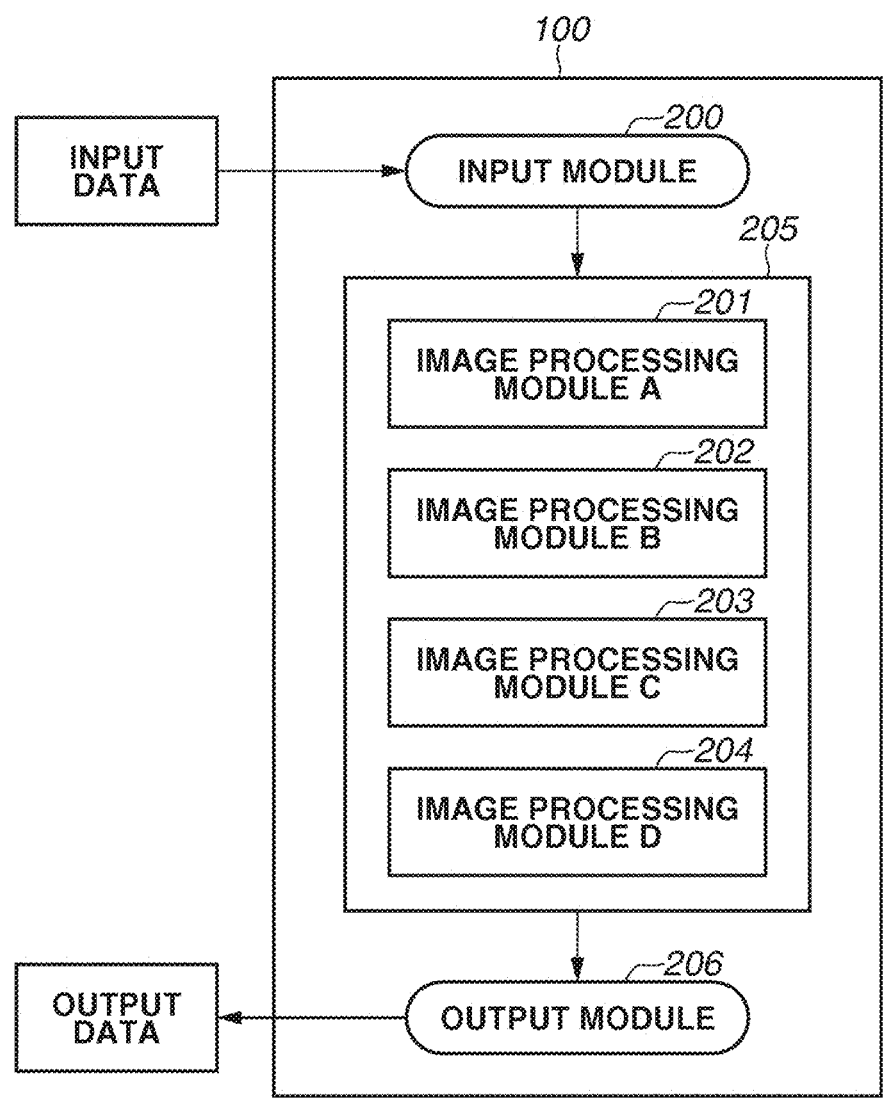
FIG. 2 is a block diagram illustrating a general configuration of an image processing unit.

Next, a general configuration of the image processing unit 100 according to the present exemplary embodiment will be described with reference to FIG. 2.

The image processing unit 100 includes an input module 200, an image processing module A_201, an image processing module B_202, an image processing module C_203, an image processing module D_204, a parallel processing unit 205, and an output module 206.

The input module 200 transfers image data from the memory 101 as input data to the parallel processing unit 205 based on a read start address, an input image height, an input image width, and a data unit per pixel which are set by the CPU 103.

The input module 200 may input the input data to the parallel processing 205 in units of pages or in units of bands into which image data is divided by a predetermined number of lines each (the addition of peripheral pixels to image data in units of pages or bands to be input to the parallel processing unit 205 will be described in detail below).

The parallel processing unit 205 includes the image processing modules (hereinafter, referred to simply as processing modules) A_201 to D_204. The respective image processing modules A_201 to D_204 can be logically connected in an arbitrary order and process data in the connected order. The respective image processing modules A_201 to D_204 can operate in parallel to perform pipeline processing.

The image processing module A_201 performs filter processing of 3×3 pixels (hereinafter, denoted as "3×3"). The peripheral pixel amounts needed when the image processing module A_201 performs the image processing are one pixel on the top, bottom, right, and left each. In other words, in order for the image processing module A_201 to perform favorable image processing, at least two pixels need to be added in a vertical direction and two pixels in a horizontal direction.

The image processing module B_202 performs 5×5 filter processing. The peripheral pixel amounts needed when the image processing module B_202 performs the image processing are two pixels on the top, bottom, right, and left each. In other words, in order for the image processing module B_202 to perform favorable image processing, at least four pixels need to be added in the vertical direction and four pixels in the horizontal direction.

The image processing module C_203 performs edge detection processing in units of two pixels. The image processing module C_203 needs no peripheral pixel when performing the image processing. However, there is a restriction to an input image size to the image processing module C_203. More specifically, an input image height and an input image width need to be even numbers of pixels.

The image processing module D_204 performs scaling processing according to a setting. The image processing module D_204 needs no peripheral pixel when performing the image processing.

The parallel processing unit 205 logically connects the image processing modules A_201 to D_204 in an arbitrary order and processes image data in the order. As will be described in detail below, according to the present exemplary embodiment, the respective image processing modules A_201 to D_204 are connected by a ring bus to be capable of permutation.

The output module 206 transfers output data to an external memory based on a set write start address, an output image height, an output image width, and a data unit (number of bits) per pixel.

Next, an outline of overall processing of the image processing apparatus 104 will be described with reference to a flowchart in FIG. 16.

The CPU 103 of the image processing apparatus 104 in a processing standby state (a state other than a power-off or power saving state) receives an instruction from a user or an image processing request from a communicable external apparatus (a computer or an information terminal), and in step S1601, the CPU 103 determines an image processing mode to perform next.

In step S1602, the CPU 103 obtains a processing order of the image processing modules A_201 to D_204 and parameters to be set to the respective image processing modules A_201 to D_204 for implementing the image processing mode determined in step S1601 from processing mode information (which is described in detail below with reference to FIG. 18A) in the memory 101. Here, the CPU 103 obtains information about a size of an input image or an output image (an input height or an output height in FIG. 18A) without peripheral pixels from the processing mode information.

Figure 3:
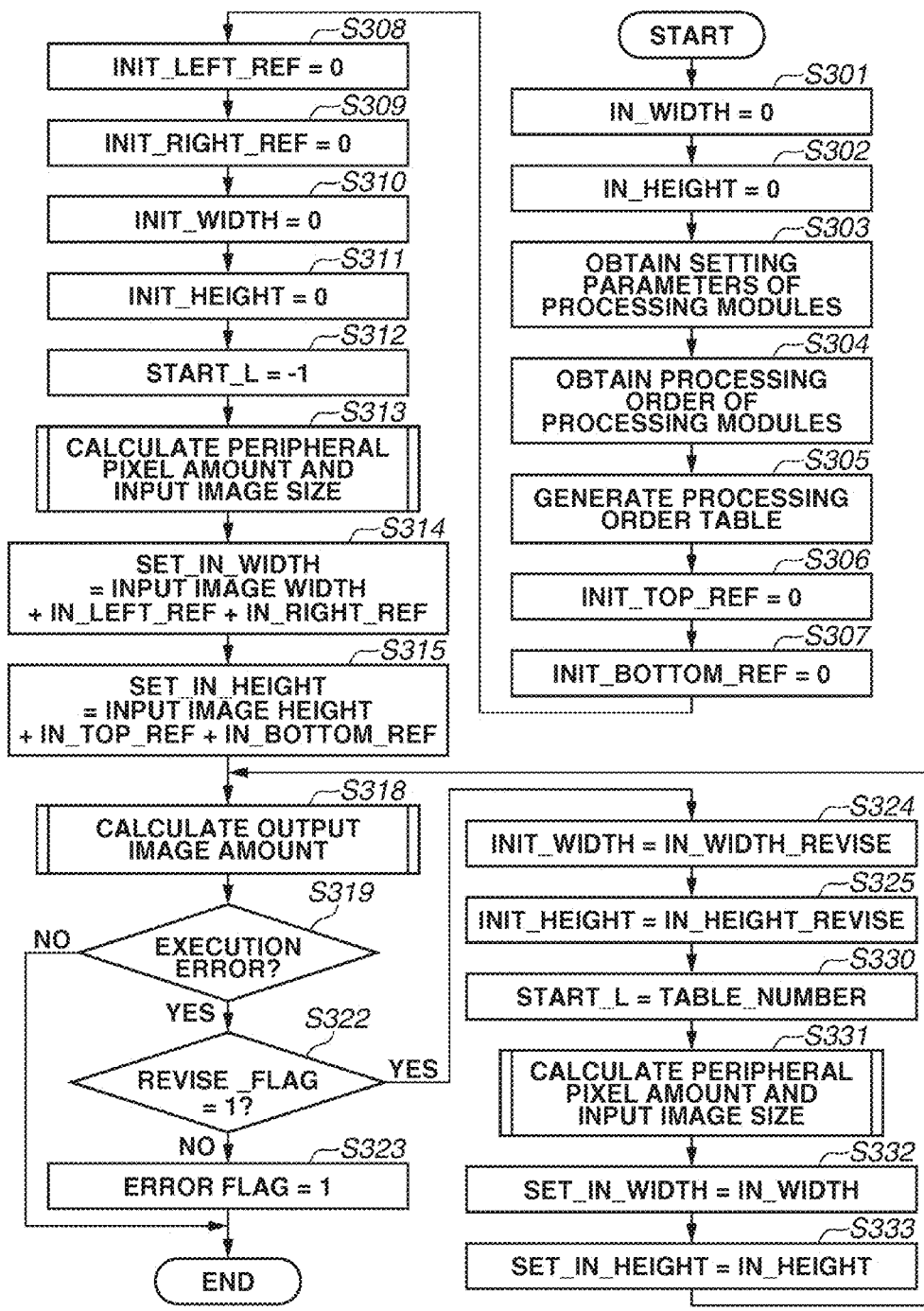
FIG. 3 is a flowchart illustrating processing for calculating a size of an input image including peripheral pixel amounts.

In step S1603, the CPU 103 obtains the peripheral pixel amounts that satisfy requirements of the respective image processing modules A_201 to D_204 based on the processing order and the parameters of the image processing modules A_201 to D_204 (details will be described below with reference to FIG. 3).

In step S1604, the CPU 103 sets (makes a register setting or the like of) the image processing unit 100 including the input module 200 and the output module 206 so that processing according to the image processing mode can be performed.

In step S1605, the image processing unit 100 activates a plurality of modules (the image processing modules A_201 to D_204, the input module 200, and the output module 206) to perform the processing according to the image processing mode.

In step S1606, the CPU 103 receives a notification from the image processing unit 100 that processing according to a next image processing mode can be started, and determines whether there is next image processing to process. If there is no next image processing (NO in step S1606), the CPU 103 ends the processing. If there is next image processing (YES in step S1606), the CPU 103 returns the processing to step S1601 to repeat similar processing.

<Calculation of Settings of Input Module 200 and Output Module 206>

Next, processing by which the CPU 103 calculates the size of an input image (input image to the parallel processing unit 205) that satisfies the requirements of the image processing modules A_201 to D_204 in a specific connection order will be described with reference to a flowchart in FIG. 3. In the following description, an image input to each processing module will be referred to as an intermediate input image, whereby the image is distinguished from the input image to the parallel processing unit 205 to be calculated. Using an input image size or an output image size calculated by such calculation processing, the CPU 103 sets the input module 200 and the output module 206. According to the present exemplary embodiment, input image sizes (without peripheral pixels) are stored in the memory 101 in advance (which is described in detail below with reference to FIGS. 18A to 18C).

Figures 18A, 18B, 18C:
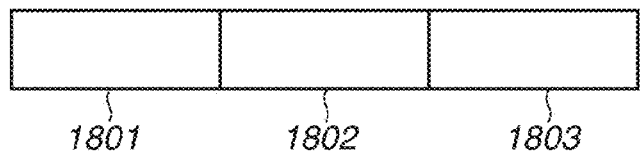
FIG. 18A is a schematic diagram illustrating processing mode information including a processing order of the processing modules and an input or output band height (without peripheral pixels) in each processing mode.
FIG. 18B is a table illustrating calculation programs corresponding to the respective processing modules.
FIG. 18C is a schematic diagram illustrating contents included in a calculation program.

Input amount calculation processing for calculating the peripheral pixel amount included in an intermediate input image from the peripheral pixel amount included in an intermediate output image and output amount calculation processing for calculating the peripheral pixel amount included in an intermediate output image from the peripheral pixel amount included in an intermediate input image are defined module by module and stored in the memory 101 as programs (which are described in detail below with reference to FIGS. 18A to 18C).

In steps S301 to S313 of the flowchart in FIG. 3, the CPU 103 deals with each of the image processing modules A_201 to D_204 in a reverse order to the order of logical connection (hereinafter, simply referred to as a processing order), and performs the input amount calculation processing corresponding to the module of interest to sequentially determine the peripheral pixel amounts.

After step S313, the CPU 103 adds the peripheral pixel amounts satisfying the requirements of the respective image processing modules A_201 to D_204 to a provisional input image size. The CPU 103 then performs the output amount calculation processing in the processing order to check whether the requirements of the image processing modules A_201 to D_204 are satisfied. Note that the input amount calculation processing and the output amount calculation processing may be implemented either by software or by hardware. The following description deals with an example where the input amount calculation processing and the output amount calculation processing are implemented by software.

In step S301, the CPU 103 initializes a variable IN_WIDTH to zero. In step S302, the CPU 103 initializes a variable IN_HEIGHT to zero.

In step S303, the CPU 103 obtains setting parameters of the respective image processing modules A_201 to D_204. Examples of the setting parameters include a value that determines the content (degree) of image processing. In scaling processing, such a value is needed when the CPU 103 determines the scaling ratio of the scaling module.

In step S304, the CPU 103 obtains the processing order of the image processing modules A_201 to D_204 from the memory 101. In step S305, the CPU 103 generates a processing order table 401 based on the information about the processing order, and stores the processing order table 401 into the memory 101. Unique identifiers (IDs), or values other than zero, are assigned to the respective processing modules A_201 to D_204. The CPU 103 stores the IDs into the processing order table 401 according to the processing order. FIG. 4 is a schematic diagram illustrating a case where the processing order of the image processing modules A_201 to D_204 in the parallel processing unit 205 is B, C, D, and A. The image processing unit 100 may have a plurality of modes, and the processing order in each mode may be stored as tables in the memory 101 in advance. In such a case, the processing in steps S304 and S305 may be omitted.

In steps S306 to S311, the CPU 103 stores zero into respective variables for initialization. More specifically, in steps S306 to S309, the CPU 103 stores zero into a variable INIT_TOP_REF which is a top peripheral pixel amount, a variable INIT_BOTTOM_REF which is a bottom peripheral pixel amount, a variable INIT_LEFT_REF which is a left peripheral pixel amount, and a variable INIT_RIGHT_REF which is a right peripheral pixel amount. Such settings are equivalent to that the peripheral pixel amounts of an image output from the last processing module in the processing order are zero.

In step S310, the CPU 103 stores zero into a variable INIT_WIDTH. In step S311, the CPU 103 stores zero into a variable INIT_HEIGHT for initialization.

In step S312, the CPU 103 stores −1 into a variable START_L which designates a reference start position of the processing order table 401.

In step S313, the CPU 103 executes the input amount calculation processing (which is described in detail below with reference to FIG. 5) using the processing order table 401 generated in step S305. The CPU 103 thus calculates the peripheral pixel amounts to be added when transferring the image stored in the memory 101 to the input module 200.

The CPU 103 stores the calculated top peripheral pixel amount into a variable IN_TOP_REF. The CPU 103 similarly stores the calculated bottom peripheral pixel amount into a variable IN_BOTTOM_REF, the calculated left peripheral pixel amount into a variable IN_LEFT_REF, and the calculated right peripheral pixel amount into a variable IN_RIGHT_REF.

In step S314, the CPU 103 stores the sum of the input image width without peripheral pixels (obtained from the memory 101) and the variables IN_LEFT_REF and IN_RIGHT_REF into a variable SET_IN_WIDTH.

In step S315, the CPU 103 stores the sum of the input image height without peripheral pixels (obtained from the memory 101) and the variables IN_TOP_REF and IN_BOTTOM_REF into a variable SET_IN_HEIGHT.

In step S318, the CPU 103 executes the output amount calculation processing (which is described in detail below with reference to FIG. 6) using the variable SET_IN_WIDTH as an input image width and the variable SET_IN_HEIGHT as an input image height. In the output amount calculation processing, the CPU 103 determines the image width and image height of an image output from the parallel processing unit 205. The CPU 103 stores the image width of the output image into a variable OUT_WIDTH, and the image height of the output image into a variable OUT_HEIGHT.

In step S319, the CPU 103 determines whether the execution of the processing in step S318 has resulted in an error. For example, the CPU 103 determines that the execution has resulted in an error if a certain processing module satisfies any one of the following conditions 1 to 4:
1. The numbers of pixels of an intermediate input image are calculated which do not satisfy the condition that the width and the height of the intermediate input image be multiples of N or M (N and M are natural numbers, at least either one of which is greater than or equal to two).
2. An intermediate input image has a width and/or a height less than a pixel width and/or a height needed for the image processing of a certain processing module.
3. Either the width or height of an intermediate output image is zero.
4. The calculated intermediate input image exceeds the capacity of an internal buffer of the processing module.

If the error is correctable, the CPU 103 sets one into a flag REVISE_FLAG which indicates whether a correction can be made. On the other hand, if the error is not correctable, the CPU 103 sets zero into the flag REVISE_FLAG. If no error has occurred, the CPU 103 ends the processing. If an error has occurred, the CPU 103 further stores the reference position of the processing order table 401 into a variable TABLE_NUMBER. If an error concerning the input image width has occurred and can be corrected by performing the input amount calculation processing again from somewhat before the processing module of interest, the CPU 103 sets a corrected input image width into a variable IN_WIDTH_REVISE. If an error concerning the input image height has similarly occurred and is correctable, the CPU 103 sets a corrected input image height (the correction will be described below with reference to FIG. 6) into a variable IN_HEIGHT_REVISE. The processing will be described in detail below.

In step S319, if the CPU 103 determines that an error has occurred (YES in step S319), the CPU 103 advances the processing to step S322. If the CPU 103 determines that no error has occurred (NO in step S319), the CPU 103 ends the processing.

In step S322, the CPU 103 determines whether the flag REVISE_FLAG is 1 (enabled). If the flag REVISE_FLAG is 1 (YES in step S322), the CPU 103 advances the processing to step S324. If the flag REVISE_FLAG is not 1 (NO in step S322), the CPU 103 advances the processing to step S323. In step S323, the CPU 103 sets an error flag to 1 (enabled), and ends the processing.

In step S324, the CPU 103 stores the variable IN_WIDTH_REVISE which is the corrected input image width provided if the error occurred in step S318 into the variable INIT_WIDTH. The variable IN_WIDTH_REVISE serves as the output image width of the previous processing module in the processing order (the corrected input image width will be described below with reference to FIG. 6).

In step S325, the CPU 103 stores the variable IN_HEIGHT_REVISE which is the corrected input image height provided if the error occurred in step S318 into the variable INIT_HEIGHT. The variable IN_HEIGHT_REVISE serves as the output image height of the previous processing module in the processing order (the corrected input image height will be described below with reference to FIG. 6).

In step S330, the CPU 103 stores the variable TABLE_NUMBER (which is described in detail below with reference to FIG. 6) provided in step S318 into the variable START_L.

In step S331, the CPU 103 executes calculation processing of the peripheral pixel amounts and the input image size again. In step S332, the CPU 103 stores the variable IN_WIDTH into the variable SET_IN_WIDTH. In step S333, the CPU 103 stores the variable IN_HEIGHT into the variable SET_IN_HEIGHT. The CPU 103 then performs the processing in step S318 again.

By the above-described processing, the CPU 103 can obtain the peripheral pixel amounts most likely to satisfy the requirements and restrictions of the image processing modules A_201 to D_204.

<Input Amount Calculation Processing>

Figure 5:
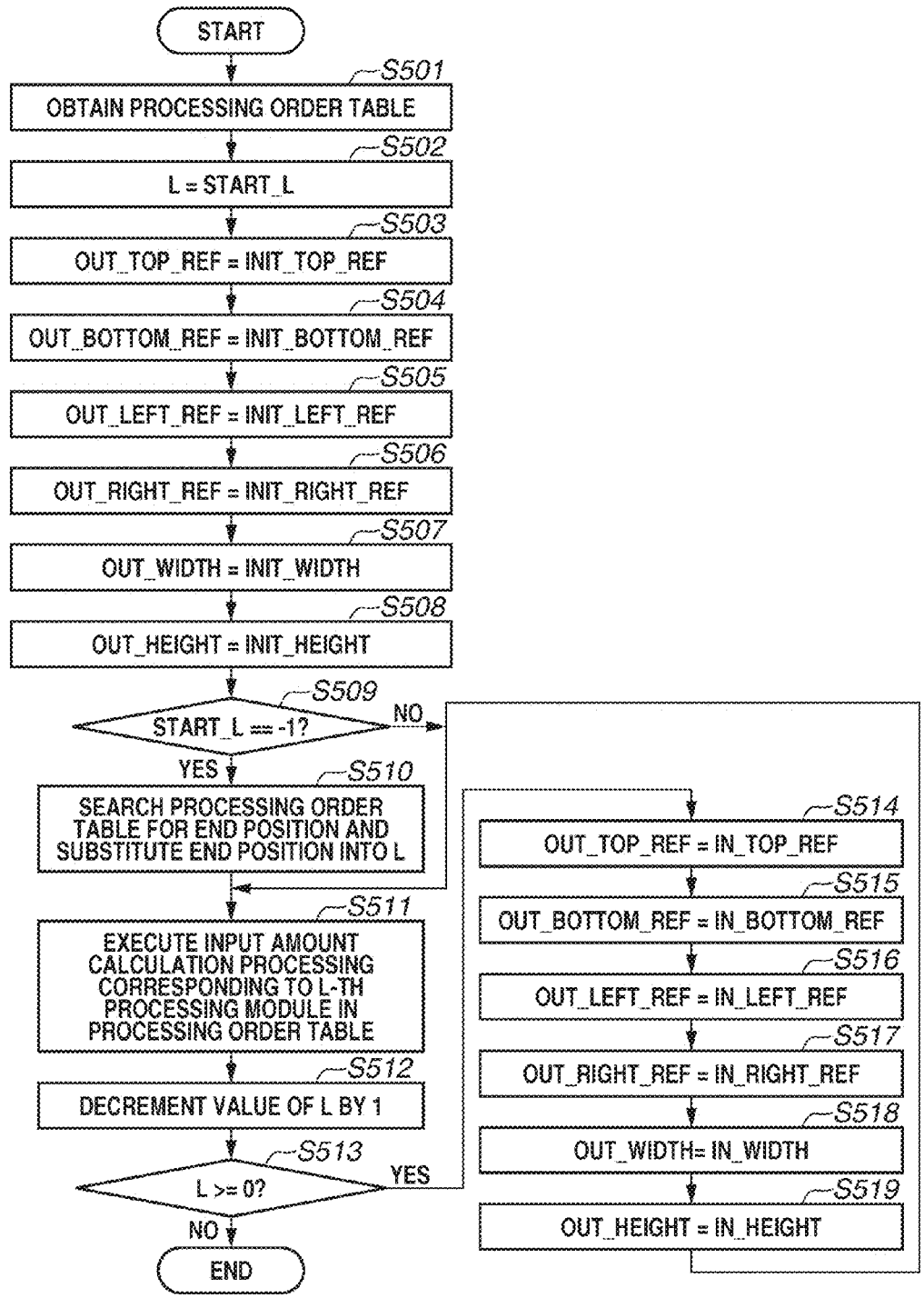
FIG. 5 is a flowchart illustrating input amount calculation processing.

Next, the input amount calculation processing in steps S313 and S331 will be described with reference to a flowchart in FIG. 5. In the input amount calculation processing, the CPU 103 performs input amount calculation processing for sequentially determining peripheral pixels to be input to the image processing modules A_201 to D_204 in a reverse order to the processing order. More specifically, the CPU 103 sequentially determines the peripheral pixel amounts to satisfy the requirements of the respective image processing modules A_201 to D_204 in the reverse order to the processing order of the plurality of processing modules A_201 to D_204. The CPU 103 thus obtains the peripheral pixel amounts to be added to the image that is input to the first processing module in the processing order.

The programs for implementing the processing for calculating the peripheral pixel amounts to be added to an intermediate input image are stored in the memory unit 101 in advance processing module by processing module.

In step S501, the CPU 103 obtains the processing order table 401 from the memory 101.

In step S502, the CPU 103 substitutes the variable START_L set in step S312 into a variable L which indicates a reference position of the processing order table 401. Setting a value greater than −1 to the variable START_L can start calculation at an intermediate position (for example, from the processing module C, D, or A in FIG. 4).

In steps S503 to S506, the CPU 103 substitutes the values initialized in steps S306 to S309 into the peripheral pixel amounts needed for zero or more processing modules subsequent to the processing module under the input amount calculation processing in the processing order (in the example in FIG. 4, no processing module if the image processing module A_201 is under the input amount calculation processing, and the two processing modules D_204 and A_201 if the image processing module C_203 is under the input amount calculation processing). More specifically, in step S503, the CPU 103 stores the variable INIT_TOP_REF into a variable OUT_TOP_REF which indicates a total top peripheral pixel amount. In step S504, the CPU 103 stores the variable INIT_BOTTOM_REF into a variable OUT_BOTTOM_REF which indicates a total bottom peripheral pixel amount. In step S505, the CPU 103 stores the variable INIT_LEFT_REF into a variable OUT_LEFT_REF which indicates a total left peripheral pixel amount. In step S506, the CPU 103 stores the variable INIT_RIGHT_REF into a variable OUT_RIGHT_REF which indicates a total right peripheral pixel amount.

In steps S507 and S508, the CPU 103 initializes a height and a width of the peripheral pixel amounts. More specifically, in step S507, the CPU 103 stores the variable INIT_WIDTH specified in step S301 into a variable OUT_WIDTH. In step S508, the CPU 103 stores the variable INIT_HEIGHT specified in step S302 into a variable OUT_HEIGHT.

In step S509, the CPU 103 determines whether the variable START_L is −1. If the variable START_L is −1 (YES in step S509), the CPU 103 performs the processing in step S510. If the variable START_L is not −1 (NO in step S509), the CPU 103 performs the processing in step S511.

In step S510, the CPU 103 searches the processing order table 401 for an end-edge position, and substitutes the end-edge position of the processing order table 401 into the variable L. In the example in FIG. 4, the end-edge position is 3 (third) and the CPU 103 substitutes 3 into the variable L. In the following description, the L-th processing module (the processing module under the input amount calculation processing) will be referred to as a module of interest.

In step S511, the CPU 103 performs the input amount calculation processing corresponding to the L-th processing module in the processing order table 401, thereby obtaining a width and a height of the peripheral pixel amounts to be input to the L-th processing module. More specifically, in step S511, the CPU 103 obtains the peripheral pixel amounts on the top, bottom, left, and right (IN_TOP_REF, IN_BOTTOM_REF, IN_LEFT_REF, and IN_RIGHT_REF) and the needed size of the peripheral pixel amounts (IN_WIDTH and IN_HEIGHT).

In step S512, the CPU 103 decrements the value of the variable L by one to change the processing module of interest to the previous processing module in the processing order.

In step S513, if the value of the variable L is greater than or equal to zero (YES in step S513), the CPU 103 performs the processing in step S514. If the value of the variable L is less than zero (NO in step S513), the CPU 103 ends the processing.

In steps S514 to S519, the CPU 103 substitutes the peripheral pixel amounts to be included in the intermediate input image, just determined in step S511, into the peripheral pixel amounts to be included in an intermediate output image of the new module of interest. More specifically, in step S514, the CPU 103 substitutes the variable IN_TOP_REF into the variable OUT_TOP_REF. In step S515, the CPU 103 substitutes the variable IN_BOTTOM_REF into the variable OUT_BOTTOM_REF. In step S516, the CPU 103 substitutes the variable IN_LEFT_REF into the variable OUT_LEFT_REF. In step S517, the CPU 103 substitutes the variable IN_RIGHT_REF into the variable OUT_RIGHT_REF. In step S518, the CPU 103 substitutes the variable IN_WIDTH into the variable OUT_WIDTH. In step S519, the CPU 103 substitutes the variable IN_HEIGHT into the variable OUT_HEIGHT.

In the example in FIG. 4, the CPU 103 repeats the processing in steps S511 to S519 while changing the module of interest in order of A, D, C, and B. If, in step S513, the variable L becomes less than zero (NO in step S513), the CPU 103 exits the flow. By the above-described processing, the CPU 103 obtains the peripheral pixel amounts to be added to the image that is input to the first processing module in the processing order.

<Output Amount Calculation Processing>

Figure 6:
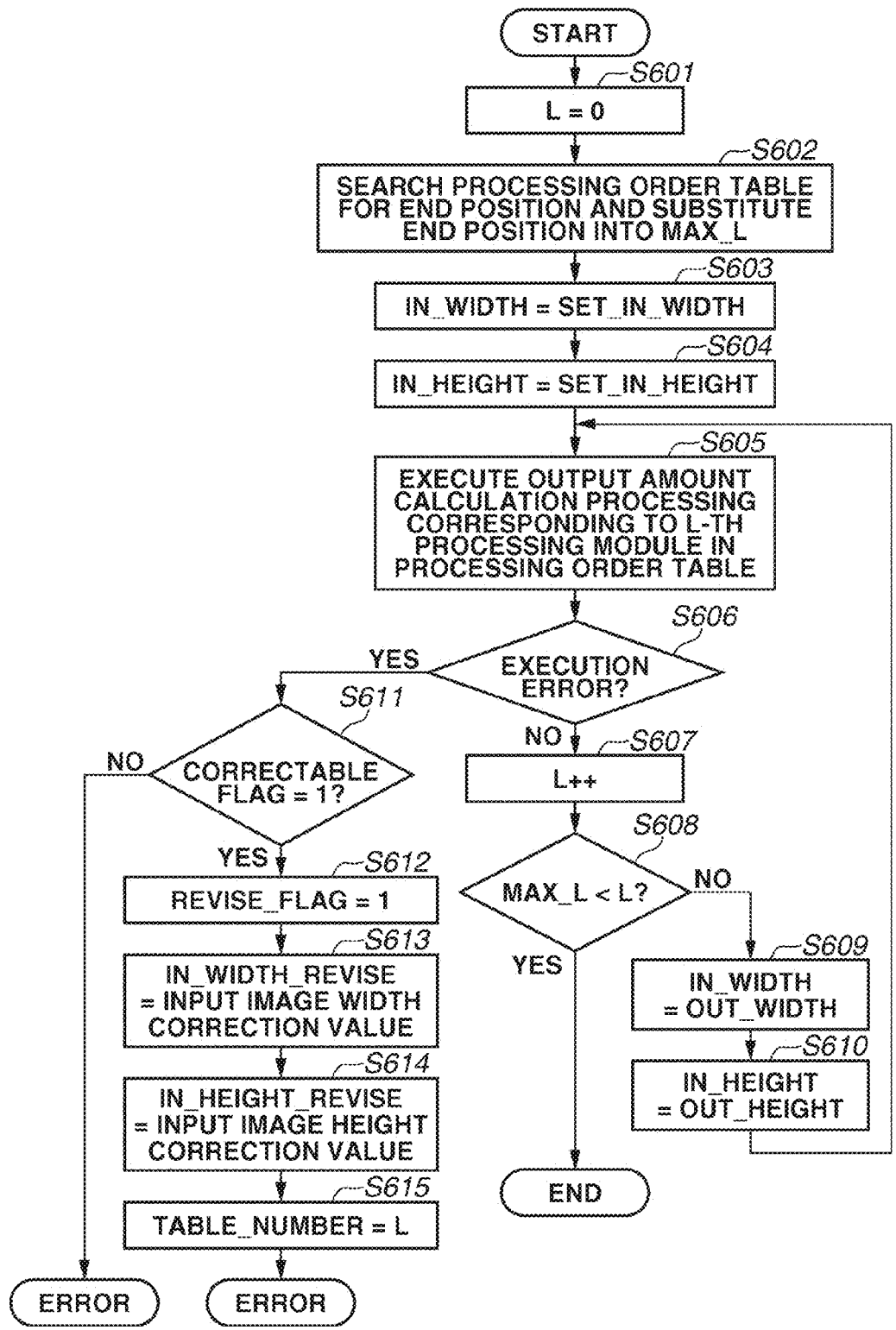
FIG. 6 is a flowchart illustrating output amount calculation processing.

Next, the output amount calculation processing in step S318 will be described in detail with reference to a flowchart in FIG. 6. In the output amount calculation processing, the CPU 103 performs output amount calculation processing corresponding to each of the image processing modules A_201 to D_204 according to the processing order.

In step S601, the CPU 103 initializes the variable L, which is a counter for managing the reference position of the processing order table 401, to zero. In step S602, the CPU 103 searches the processing order table 401 for an end-edge position, and substitutes the end-edge position into a variable MAX_L. In step S603, the CPU 103 substitutes the variable SET_IN_WIDTH which is the width of the input image set in step S314 into the variable IN_WIDTH. In step S604, the CPU 103 substitutes the variable SET_IN_HEIGHT which is the height of the input image set in step S315 into the variable IN_HEIGHT.

In step S605, the CPU 103 executes the output amount calculation processing corresponding to the L-th processing module in the processing order table 401. In step S606, the CPU 103 determines whether the execution of the processing in step S605 has resulted in an error. If an error has occurred (YES in step S606), the CPU 103 performs the processing in step S611. If no error has occurred (NO in step S606), the CPU 103 performs the processing in step S607 (the criteria of an error are the same as described in the processing in step S319).

In step S607, the CPU 103 increments the variable L by one. In step S608, the CPU 103 compares the variable MAX_L with the variable L. If the variable MAX_L is less than the variable L (YES in step S608), the CPU 103 ends the processing. If not (NO in step S608), the CPU 103 performs the processing in step S609.

In step S609, the CPU 103 substitutes the variable OUT_WIDTH which is the width of the output image obtained as a result of the execution of the processing in step S605 into the variable IN_WIDTH.

In step S610, the CPU 103 substitutes the variable OUT_HEIGHT which is the height of the output image obtained as a result of the execution of the processing in step S605 into the variable IN_HEIGHT.

In step S611, if a correctable flag which is indicated when the processing of step S605 has resulted in an error is one (YES in step S611), the CPU 103 performs the processing in step S612. If the correctable flag is not one (NO in step S611), the CPU 103 determines that an error has occurred.

In step S612, the CPU 103 substitutes one into the flag REVISE_FLAG. In step S613, the CPU 103 substitutes an input image width correction value which is provided if the processing in step S605 has resulted in an error and the error is correctable into the variable IN_WIDTH_REVISE. In step S614, the CPU 103 substitutes an input image height correction value which is provided if the processing in step S605 has resulted in an error and the error is correctable into the variable IN_HEIGHT_REVISE. In steps S613 and S614, the CPU 103 determines the input image width correction value and the input image height correction value according to a correction value calculation program included in the calculation program of each processing module.

In step S615, the CPU 103 substitutes the variable L into the variable TABLE_NUMBER.

<Specific Examples of Input Amount Calculation Processing According to Algorithms of Respective Processing Modules>

Next, specific examples of the input amount calculation processing according to algorithms of the respective processing modules A_201 to D_204 will be described with reference to FIGS. 7 and 8.

The input amount calculation processing defined for each processing module includes calculation of "the peripheral pixel amounts (top, bottom, left, right, width, and height)" needed by the module of interest based on "the peripheral pixel amounts (top, bottom, left, right, width, and height)" needed by (zero or more) processing modules subsequent to the module of interest in the processing order. The algorithm of the input amount calculation processing varies with the algorithm of the image processing performed by the module of interest.

Figure 7:
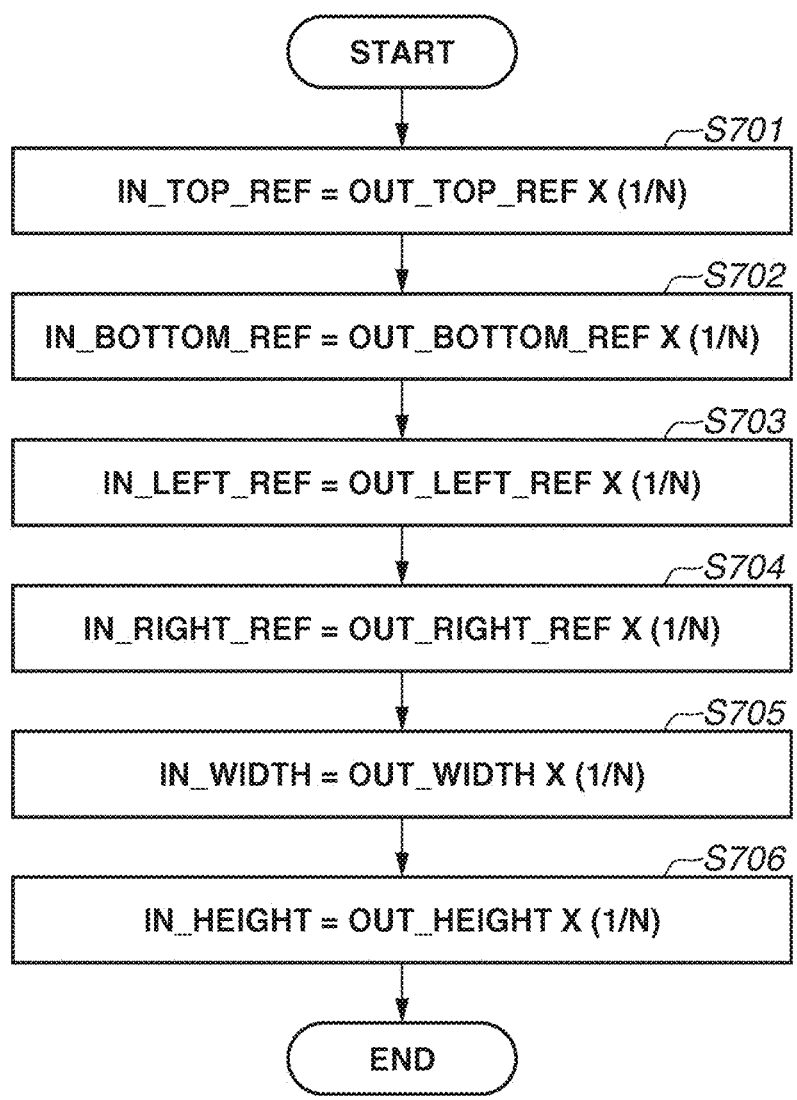
FIG. 7 is a flowchart illustrating input amount calculation processing corresponding to a reduction processing module.

FIG. 7 illustrates a specific example of the input amount calculation processing by the CPU 103 for a reduction processing module. In FIG. 7, the CPU 103 multiplies the peripheral pixel amounts to be input to the reduction processing module by N ($0<N<1$) both in the vertical and horizontal directions in view of the reduction processing.

In step S701, the CPU 103 stores the variable OUT_TOP_REF, which indicates the top peripheral pixel amount needed after the module of interest, multiplied by the reciprocal (1/N) of the scaling ratio into the variable IN_TOP_REF. Similarly, in step S702, the CPU 103 stores the variable OUT_BOTTOM_REF multiplied by the reciprocal (1/N) of the scaling ratio into the variable IN_BOTTOM_REF. In step S703, the CPU 103 stores the variable OUT_LEFT_REF multiplied by the reciprocal (1/N) of the scaling ratio into the variable IN_LEFT_REF. In step S704, the CPU 103 stores the variable OUT_RIGHT_REF multiplied by the reciprocal (1/N) of the scaling ratio into the variable IN_RIGHT_REF.

In step S705, the CPU 103 stores the variable OUT_WIDTH, which is needed after the module of interest, multiplied by the reciprocal (1/N) of the scaling ratio into the variable IN_WIDTH. Similarly, in step S706, the CPU 103 stores the variable OUT_HEIGHT multiplied by the reciprocal (1/N) of the scaling ratio into the variable IN_HEIGHT.

According to the above-described processing, the CPU 103 obtains the size (IN_WIDTH and IN_HEIGHT) and the peripheral pixel amounts (IN_TOP_REF, IN_BOTTOM_REF, IN_LEFT_REF, and IN_RIGHT_REF) of the intermediate input image to be input to the reduction processing module.

Figure 8:
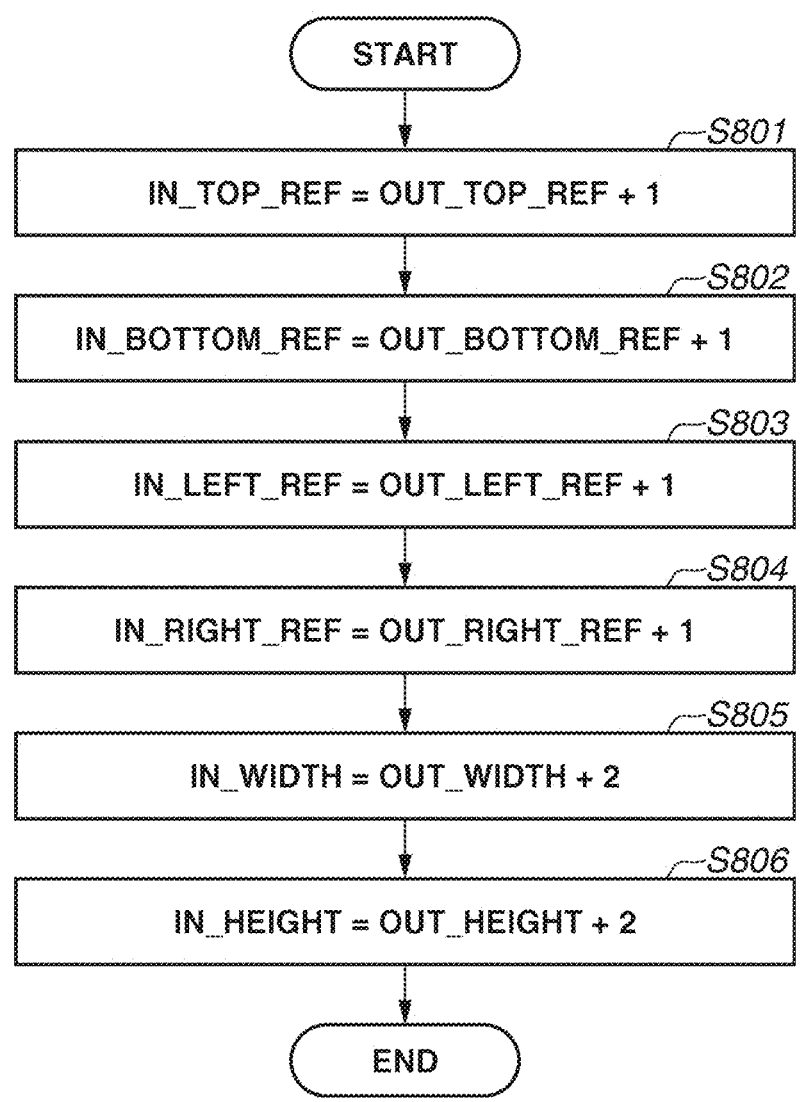
FIG. 8 is a flowchart illustrating input amount calculation processing corresponding to a 3×3 filter processing module.

FIG. 8 illustrates an example of the input amount calculation processing corresponding to a filter processing module. For ease of description, the following description deals with 3×3 filter processing.

In step S801, the CPU 103 adds one, which is the top peripheral pixel amount needed by the module of interest, to the variable OUT_TOP_REF which stores the top peripheral pixel amount needed after the module of interest. The CPU 103 stores the sum into the variable IN_TOP_REF. Similarly, in step S802, the CPU 103 adds one, which is the bottom peripheral pixel amount needed by the module of interest, to the variable OUT_BOTTOM_REF which stores the bottom peripheral pixel amount needed after the module of interest. The CPU 103 stores the sum into the variable IN_BOTTOM_REF. In step S803, the CPU 103 adds one, which is the left peripheral pixel amount needed by the module of interest, to the variable OUT_LEFT_REF which stores the left peripheral pixel amount needed after the module of interest. The CPU 103 stores the sum into the variable IN_LEFT_REF. Then, in step S804, the CPU 103 adds one, which is the right peripheral pixel amount needed by the module of interest, to the variable OUT_RIGHT_REF which stores the right peripheral pixel amount needed after the module of interest. The CPU 103 stores the sum into the variable IN_RIGHT_REF.

In step S805, the CPU 103 adds two, which is the sum of the left and right peripheral pixel amounts needed by the module of interest, to the variable OUT_WIDTH which stores the input image width needed after the module of interest. The CPU 103 stores the calculation result into the variable IN_WIDTH. Similarly, in step S806, the CPU 103 adds two, which is the sum of the top and bottom peripheral pixel amounts needed by the module of interest, to the variable OUT_HEIGHT which stores the input image height needed after the module of interest. The CPU 103 stores the calculation result into the variable IN_HEIGHT.

According to the above-described processing, the CPU 103 obtains the size (IN_WIDTH and IN_HEIGHT) and the peripheral pixel amounts (IN_TOP_REF, IN_BOTTOM_REF, IN_LEFT_REF, and IN_RIGHT_REF) of the intermediate input image to be input to the filter processing module.

Note that the above-described example has dealt with a case with a 3×3 filter processing module. Such processing may be extended to an N×M-pixel filter processing module. N and M are both natural numbers, and at least either one of which is greater than or equal to two. N and M indicate a width and a height, respectively.

The peripheral pixel amounts needed by the N×m filter processing module are as follows: The left peripheral pixel amount is N/2. The right peripheral pixel amount is (N−1)/2. The top peripheral pixel amount is M/2. The bottom peripheral pixel amount is (M−1)/2. Such calculation formulas are intended for a case where the pixel of interest is positioned in the center like the 5×5 filter of the processing module B illustrated in FIG. 13C. The calculation formulas may be modified according to the position of the pixel of interest.

In a case of a 3×3 filter, the left peripheral pixel amount and the top peripheral pixel amount are 3/2=1. The right peripheral pixel amount and the bottom peripheral pixel amount are (3−1)/2=1. In a case of a 4×4 filter, the left peripheral pixel amount and the top peripheral pixel amount are 4/2=2. The right peripheral pixel amount and the bottom peripheral pixel amount are (4−1)/2=1. In a case of a 5×5 filter, the left peripheral pixel amount and the top peripheral pixel amount are 5/2=2. The right peripheral pixel amount and the bottom peripheral pixel amount are (5−1)/2=2.

<Specific Examples of Output Amount Calculation Processing According to Algorithms of Respective Processing Modules>

Next, specific examples of the output amount calculation processing according to algorithms of the respective processing modules will be described with reference to FIGS. 9, 10, and 11.

Figure 9:
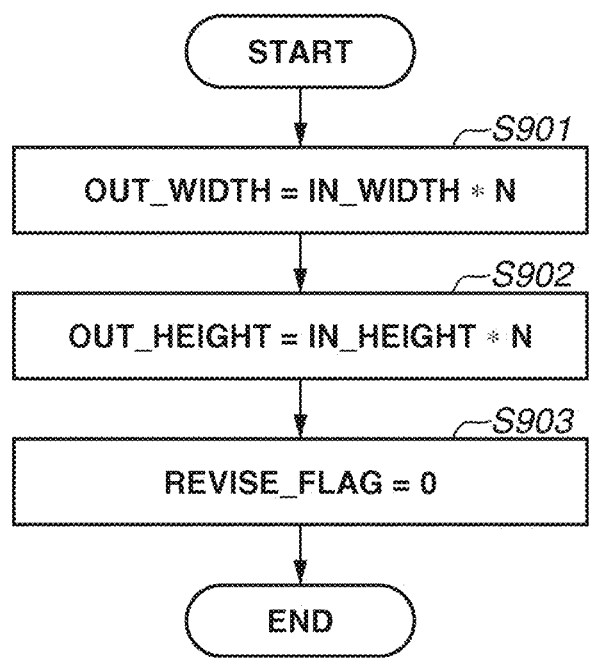
FIG. 9 is a flowchart illustrating output amount calculation processing corresponding to the reduction processing module.

FIG. 9 illustrates an example of the output amount calculation processing corresponding to a reduction processing module. In FIG. 9, it is assumed that the reduction processing module is set to multiply the size of an intermediate input image by N both in the vertical and horizontal directions.

In step S901, the CPU 103 stores the variable IN_WIDTH, which stores an input image width, multiplied by the scaling ratio N into the variable OUT_WIDTH.

In step S902, the CPU 103 stores the variable IN_HEIGHT, which stores an input image height, multiplied by the scaling ratio N into the variable OUT_HEIGHT.

In step S903, the CPU 103 stores zero (not corrected) into the flag REVISE_FLAG which indicates that the width and/or the height of the intermediate input image has been corrected.

Figure 10:
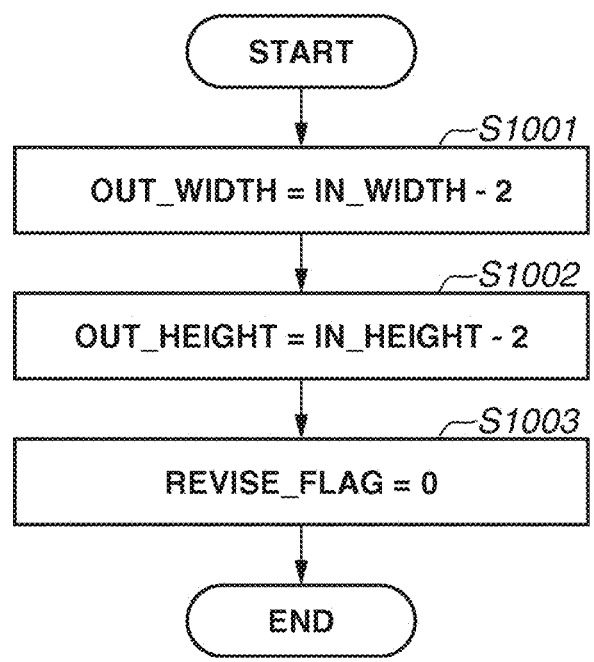
FIG. 10 is a flowchart illustrating output amount calculation processing corresponding to the 3×3 filter processing module.

FIG. 10 illustrates an example of the output amount calculation processing corresponding to a processing module that needs a plurality of input pixels including peripheral pixels to output an output pixel like filter processing. Suppose that the filter processing is 3×3 filter processing.

In step S1001, the CPU 103 subtracts two, which is the sum of the left and right peripheral pixel amounts, from the variable IN_WIDTH which stores the input image width. The CPU 103 stores the calculation result into the variable OUT_WIDTH.

In step S1002, the CPU 103 substrates two, which is the sum of the top and bottom peripheral pixel amounts, from the variable IN_HEIGHT which stores the input image height. The CPU 103 stores the calculation result into the variable OUT_HEIGHT.

In step S1003, the CPU 103 stores zero (not corrected) into the flag REVISE_FLAG which indicates that the width and/or the height of the intermediate input image has been corrected.

Figure 11:
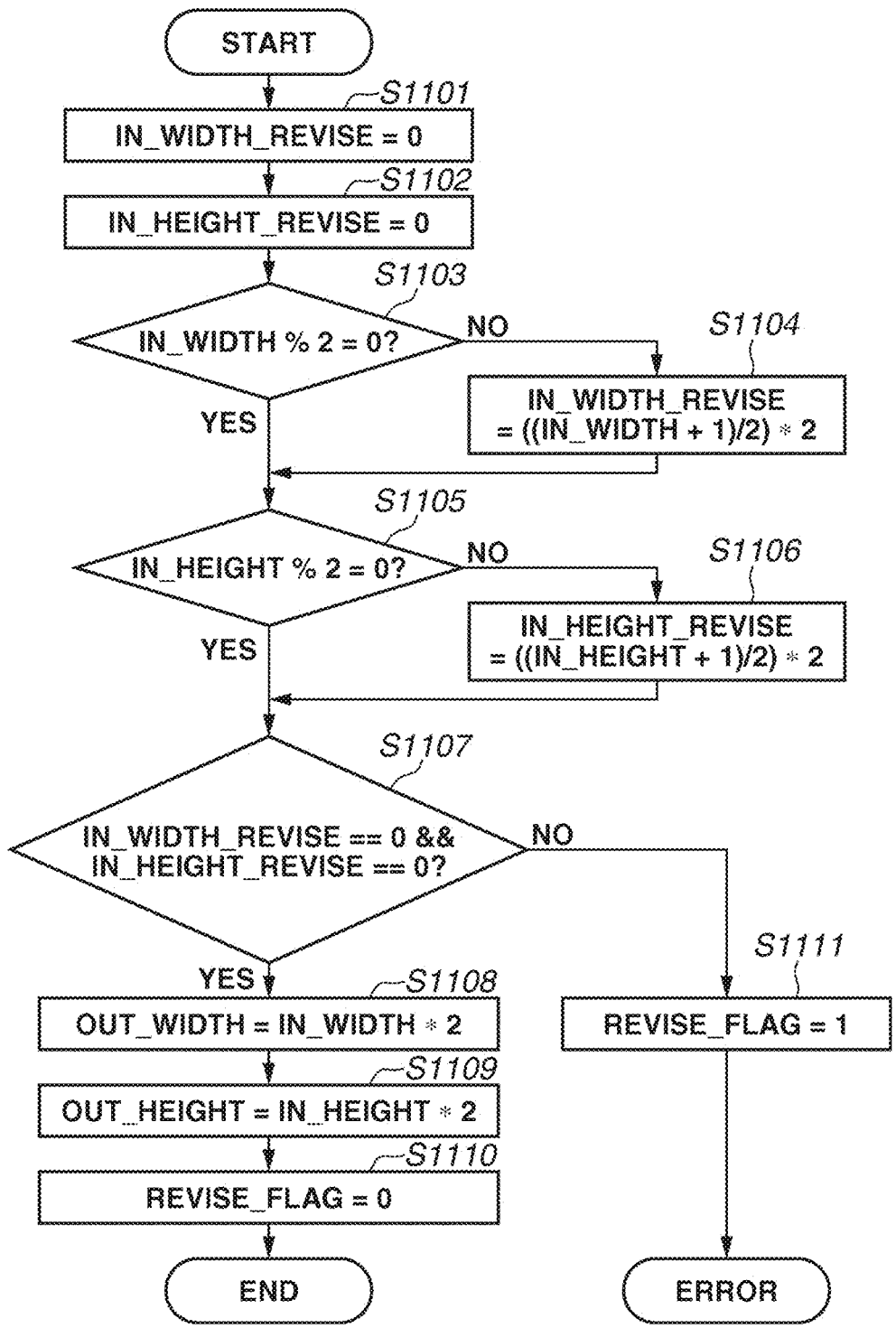
FIG. 11 is a flowchart illustrating output amount calculation processing corresponding to a reduction processing module with an input restriction.

FIG. 11 illustrates an example of the output amount calculation processing corresponding to an N-fold (N=2) enlargement processing module with an input restriction. The input restriction is such that both the width and height of the intermediate input image need to be multiples of two.

In step S1101, the CPU 103 initializes the variable IN_WIDTH_REVISE to zero. In step S1102, the CPU 103 initializes the variable IN_HEIGHT_REVISE to zero.

In step S1103, if the remainder of the variable IN_WIDTH divided by two is zero (YES in step S1103), the CPU 103 advances the processing to step S1105. If the remainder is not zero (NO in step S1103), the CPU 103 advances the processing to step S1104.

In step S1104, the CPU 103 stores a number determined by rounding up the variable IN_WIDTH to a multiple of two into the variable IN_WIDTH_REVISE to correct the width of the intermediate input image to satisfy the input restriction.

In step S1105, if the remainder of the variable IN_HEIGHT divided by two is zero (YES in step S1105), the CPU 103 advances the processing to step S1107. If the remainder is not zero (NO in step S1105), the CPU 103 advances the processing to step S1106.

In step S1106, the CPU 103 stores a number determined by rounding up the variable IN_HEIGHT to a multiple of two into the variable IN_HEIGHT_REVISE to correct the height of the intermediate input image to satisfy the input restriction.

In step S1107, if the variable IN_WIDTH_REVISE is zero and the variable IN_HEIGHT_REVISE is zero (YES in step S1107), the CPU 103 advances the processing to step S1108. If such a condition is not satisfied (NO in step S1107), the CPU 103 advances the processing to step S1111.

In step S1108, the CPU 103 stores the variable IN_WIDTH multiplied by two into the variable OUT_WIDTH.

In step S1109, the CPU 103 stores the variable IN_HEIGHT multiplied by two into the variable OUT_HEIGHT.

In step S1110, the CPU 103 stores zero (not corrected) into the flag REVISE_FLAG which indicates that the width and/or the height of the intermediate input image has been corrected.

In step S1111, the CPU 103 stores one (corrected) into the flag REVISE_FLAG which indicates that the width and/or the height of the intermediate input image has been corrected. The flag REVISE_FLAG is used to determine whether to perform the processing in steps S324 to S333 when an execution error occurs.

Although not illustrated in the drawings, processing modules that consume no peripheral pixel can simply use the size and the peripheral pixel amounts of an intermediate input image as the size and the peripheral pixel amounts of an intermediate output image. Examples of such processing modules include a color conversion processing module that converts the color space of an image from red, green, and blue (RGB) to cyan, magenta, yellow, and black (CMYK), or vice versa, and a color processing module that converts a color image into a gray scale.

<Addition of Peripheral Pixels>

Next, the addition of peripheral pixels to an input image to be input to the parallel processing unit 205 will be described in detail.

Figure 17A:
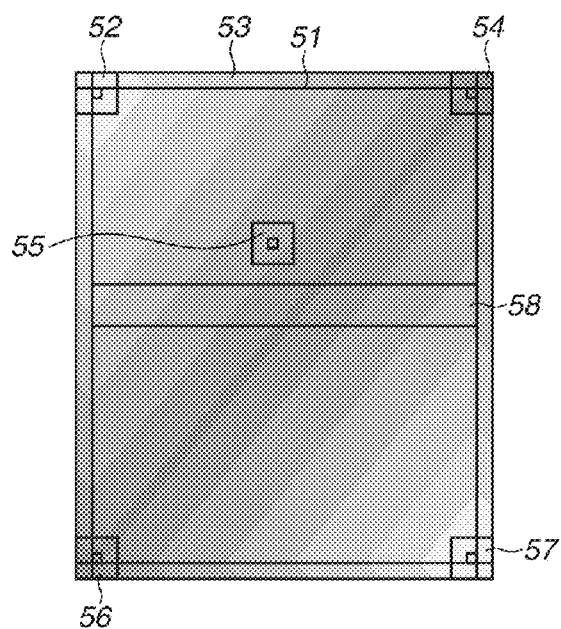
FIG. 17A is a schematic diagram illustrating the addition of peripheral pixels to an input image in units of a page.

FIG. 17A is a schematic diagram illustrating the addition of peripheral pixels to an input image in units of a page. Suppose that the parallel processing unit 205 includes a processing module that uses a predetermined range (areas 52, 54, 55, 56, and 57) for processing. The memory 101 stores a page of image 51 to which an area 53 is added based on restrictions and needed peripheral pixels of a plurality of processing modules. As a specific example of a method for adding pixels, the input module 200 may read the same address of the image 51 in the memory 101 for a plurality of times to add an image folded back at an image end portion. If the image 51 is a scan image read by a scanner (not illustrated) of the image processing apparatus 104, an address area to be read into the parallel processing unit 250 may be extended to add pixels (a scanner typically obtains a scan image by clipping a part of an image area scanned by a line sensor). In addition, the CPU 103 and/or the input module 200 may add pixels of certain values as margin pixels.

The input image to which the area 53 has been added is stored into an input/output buffer 1401 (see FIG. 14A) of the parallel processing unit 205.

Figure 17B:
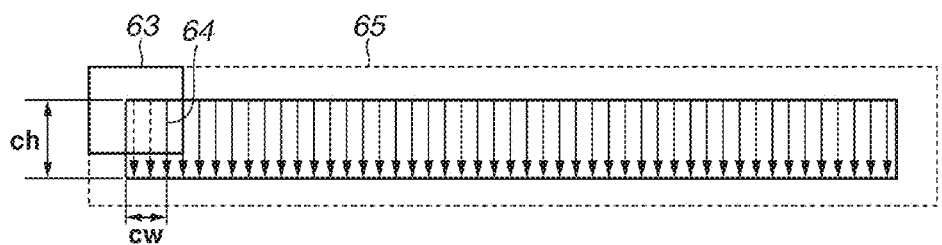
FIG. 17B is a schematic diagram illustrating the addition of peripheral pixels to an input image in units of a band.

FIG. 17B is a schematic diagram illustrating the addition of peripheral pixels to an input image in units of a band (for example, an area 58 in FIG. 17A). The CPU 103 divides the image 51 stored in the memory 101 into strips, and inputs the divided partial images of strip shape (band images) into the parallel processing unit 205 in order. The input/output buffer 1401 of the parallel processing unit 205 stores the input image (a dotted-line area 65) to which peripheral pixels have been added.

<Ring Bus>

Next, the ring bus included in the parallel processing unit 205 of the present exemplary embodiment will be described in detail.

Figure 14A:
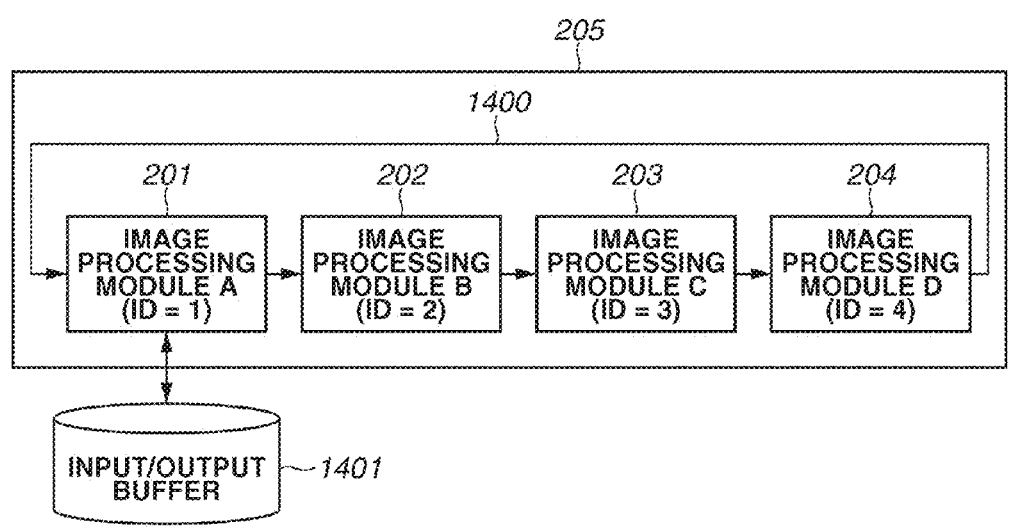
FIG. 14A is a block diagram illustrating a general configuration of a parallel processing unit including a ring bus.

FIG. 14A illustrates a general configuration of the parallel processing unit 205. The parallel processing unit 205 includes the plurality of processing modules A_201 to D_204. The ring bus 1400 is a bus for transmitting packets between the image processing modules A_201 to D_204. The image processing modules A_201 to D_204 are connected via the ring bus 1400. Each processing module is configured to receive a data packet from one adjoining processing module, perform predetermined processing, and transmit the processed data packet to the other adjoining processing module. The packets transmitted and received by the image processing modules A_201 to D_204 move through the ring bus 1400 in one direction. In the following description, a ring-shaped bus for circulating data (or packets) in one direction will be simply referred to as a ring bus.

The input/output buffer 1401 is a buffer for inputting and outputting data and includes a static random access memory (SRAM). Each of the image processing modules A_201 to D_204 includes information for identifying itself (in FIG. 14A, such information is illustrated as "ID"). The processing module A having an ID of 1 is connected to the input/output buffer 1401, and manages input/output of data.

Figure 15:
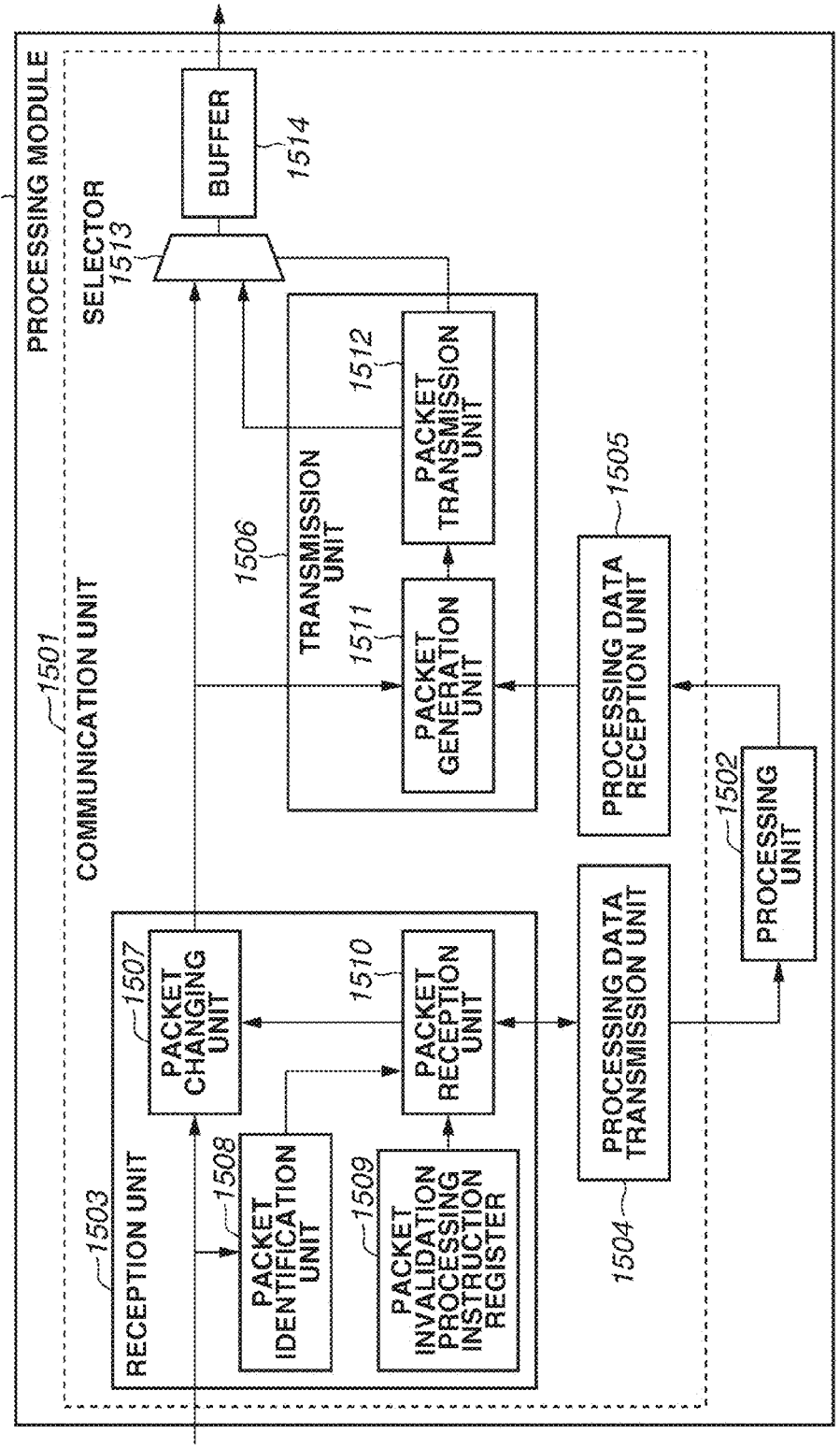
FIG. 15 is a block diagram illustrating a configuration of an image processing module which uses a ring bus.

Next, a general configuration of the respective image processing modules A_201 to D_204 will be described with reference to FIG. 15. In FIG. 15, a packet identification unit 1508 determines whether to accept a packet coming from another processing module. If the packet identification unit 1508 receives a packet having a transmission source ID coincident with an ID the packet identification unit 1508 is waiting for, the packet identification unit 1508 outputs the packet to a packet reception unit 1510.

The packet reception unit 1510 performs reception processing of the packet. A processing data transmission unit 1504 transmits data to be processed to a processing unit 1502. The processing unit 1502 performs actual image processing. A processing data reception unit 1505 receives processed data from the processing unit 1502. A packet generation unit 1511 generates a packet based on the processed data received from the processing unit 1502 and an output from a packet changing unit 1507. The packet generation unit 1511 stores an identifier of the own processing module into a register (not illustrated), and stores the value of the register into a transmission source ID 1412 (see FIG. 14B) of the generated packet.

A packet transmission unit 1512 transmits a packet to the ring bus 1400. The packet changing unit 1507 changes values of a data valid flag 1411 and a suspension flag 1414 of the packet (details of the packet will be described below) according to an instruction from the packet reception unit 1510. A selector 1513 selects either one of the packet from the packet transmission unit 1512 and the packet from the packet changing unit 1507 based on an instruction from the packet transmission unit 1512. If there is no instruction from the packet transmission unit 1512, the selector 1513 selects and outputs the packet from the packet changing unit 1507. A buffer 1514 is used to transfer packets in succession. According to the present exemplary embodiment, the buffer 1514 stores a packet for one cycle.

Depending on a state of the processing unit 1502, the packet reception unit 1510 sometimes needs to suspend packet reception.

Figure 14B:
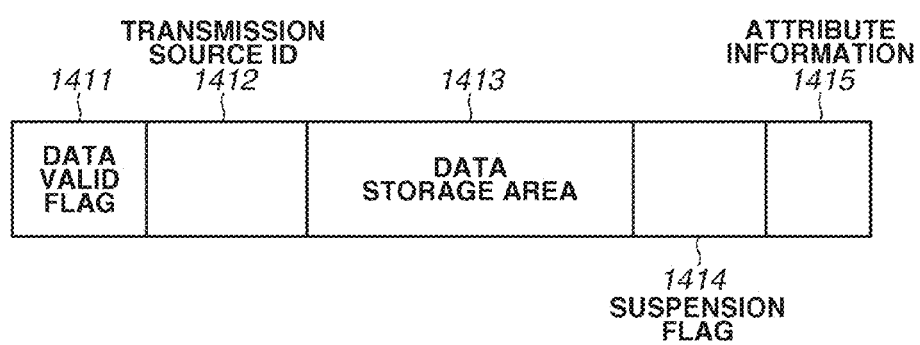
FIG. 14B is a schematic diagram illustrating a format of a packet used in a ring bus.

FIG. 14B illustrates a format of a packet needed to transmit and receive data between the image processing modules. The data valid flag 1411 indicates whether the packet contains valid data. For example, if the data valid flag 1411 is "1," the packet contains valid data, whereas if the data valid flag 1411 is "0," the packet contains no valid data.

The transmission source ID 1412 stores the identifier of the processing module that has transmitted the packet. A data storage area 1413 stores the main body of processing data. According to the present exemplary embodiment, the data storage area 1413 has a capacity of 32 bits and stores pixel data of an RGB or CMYK pixel. The suspension flag 1414 is set to "1" when the processing module suspends the processing of the packet. More specifically, if the suspension flag 1414 is "1," it indicates that the processing of the packet is suspended on the reception side. For example, processing may be suspended when a next processing module to perform processing on data receives the packet and is not able to process the data because its processing unit 1502 is in a busy state. The suspension flag 1414 has an initial value of "0." Attribute information 1515 includes other meta data. For example, the attribute information 1515 includes flow identification information that indicates which data flow each packet belongs to when the parallel processing unit 205 provides a plurality of data flows.

Each processing module stores a waiting packet ID in a register (not illustrated) in the packet identification unit 1508. The packet identification unit 1508 fetches a packet into the packet reception unit 1510 when the waiting packet ID coincides with the transmission source ID 1412 of the packet flowing through the ring bus 1400.

For example, suppose that the image processing modules A_201 to D_204 constitute a data path in order of modules A, B, C, D, and A. In such a case, the waiting packet ID of the image processing module A_201 is set to 3, the waiting packet ID of the image processing module B_202 is set to 4, the waiting packet ID of the image processing module C_203 is set to 2, and the waiting packet ID of the image processing module D_204 is set to 1. Accordingly, the data path can be formed by setting the waiting packet ID to each image processing module. An input from the input/output buffer 1401 is directly input to the processing unit 1502 of the image processing module A_201. The waiting packet IDs of the respective processing modules A_201 to D_204 are set in advance. The information about the waiting packet ID is stored in the registers (not illustrated) of the packet identification units 1508.

Next, a data reception method of a communication unit 1501 will be described. For example, suppose that the image processing module A_201 having an ID of 1 in FIG. 14A transfers a packet to the image processing module C_203 having an ID of 3. In such a case, the packet identification unit 1508 of the image processing module C_203 obtains a packet in which the data valid flag 1411 is valid, and compares the transmission source ID 1412 of the packet with its own waiting packet ID. If the two IDs are the same, the packet identification unit 1508 transmits the packet to the packet reception unit 1510.

The processing data transmission unit 1504 determines (performs a handshake) whether the processing unit 1502 is capable of processing. If the processing unit 1502 is determined to be capable of processing, the packet reception unit 1510 extracts data to be processed from the obtained packet and transmits the extracted data to the processing data transmission unit 1504. If a packet invalidation processing instruction register 1509 has a value of "0" at the time of the data extraction, the packet is no longer needed. Thus, the packet reception unit 1510 instructs the packet changing unit 1507 to set the data valid flag 1411 to invalid (0). (If the packet invalidation processing instruction register 1509 has a value of "1," the packet reception unit 1501 will not issue the instruction to set the data valid flag 1411 to invalid (0).)

On the other hand, if the processing data transmission unit 1504 determines that the processing unit 1502 is busy (no new data can be input), the packet reception unit 1510 instructs the packet changing unit 1507 to set the suspension flag 1414 of the packet to 1. The packet changing unit 1507 changes the data valid flag 1411 or the suspension flag 1414 according to an instruction from the packet reception unit 1510, and transmits the packet to the selector 1513. The selector 1513 selects either one of the inputs from the packet changing unit 1507 and the packet transmission unit 1512, and transmits the selected packet to the buffer 1514.

The packet of which suspension flag 1414 is set to valid (1) simply circulates through the ring bus 1400. If the processing module that has set the suspension flag 1414 to valid is not in a busy state when the packet has circulated up to the processing module, the processing module processes the packet like an ordinary packet. The packet therefore need not be retransmitted on purpose. The parallel processing unit 205 using such a ring bus can thus efficiently transfer data between the image processing modules A_201 to D_204.

<Processing Mode Information and Calculation Programs>

FIG. 18A is a schematic diagram illustrating processing mode information including the processing order of the image processing modules A_201 to D_204 and input and output band heights (without peripheral pixels) in each processing mode. The processing mode information is stored in a read-only memory (ROM) of the memory 101 in advance at the time of shipment from the factory. A mode ID is an identifier of the processing mode. A processing order indicates the processing order of the image processing modules A_201 to D_204. An input height is the input band height (without peripheral pixels). An output height is the output band height (without peripheral pixels). Input and output band widths may also be set with respect to each of the processing modes. In this example, the input and output band widths are given as a fixed value (200) regardless of the processing mode, and are thus omitted. The processing mode having a mode ID of 4 includes processing order including branch processing.

FIG. 18B illustrates a table that stores correspondence between the image processing modules A_201 to D_204 and identifiers representing corresponding calculation programs. Similar to the processing mode information, the table is stored in the memory 101. The table may include alternative information such as a relative address instead of the identifiers of the calculation programs.

FIG. 18C illustrates contents of the calculation program having an identifier of 1. An area 1801 represents an input amount calculation program. An area 1802 represents an output amount calculation program. An area 1803 represents a correction value calculation program. Similar to the processing mode information, the calculation programs of the respective image processing modules A_201 to D_204 are stored in the memory 101.

As described above, according to the present exemplary embodiment, it is possible to obtain the peripheral pixel amounts at least to be added to obtain a favorable result when the plurality of image processing modules including ones that perform processing using peripheral pixels are made to perform processing in a desired processing order. In addition, the input and output modules can be set to add the obtained peripheral pixel amounts to obtain a favorable image processing result.

Figure 12:
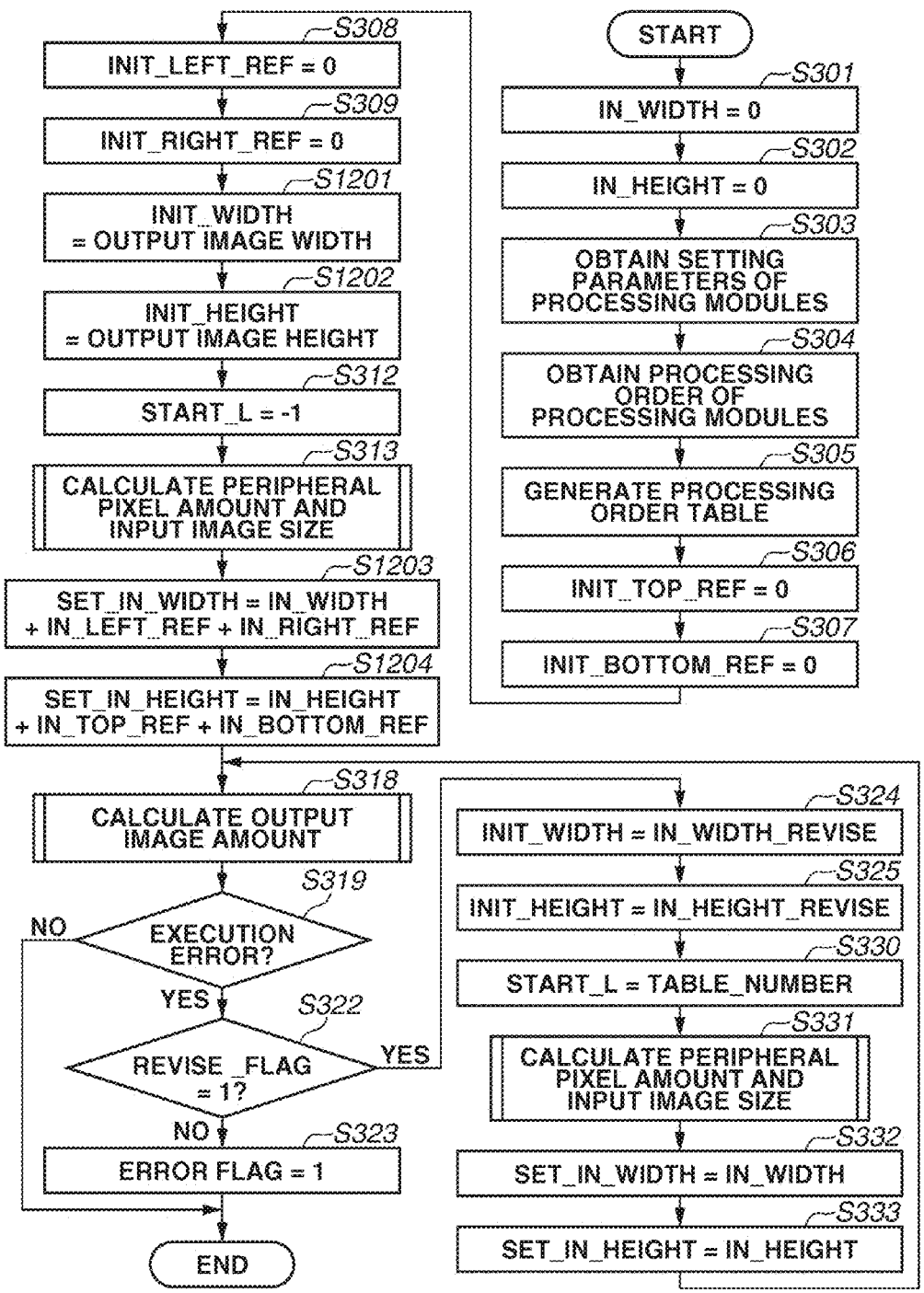
FIG. 12 is a flowchart illustrating processing for calculating a size of an input image including peripheral pixel amounts.

According to the first exemplary embodiment, the peripheral pixel amounts and the size of an input image (including peripheral pixels) are determined from an input image size (an input band height and the like). According to a second exemplary embodiment, as illustrated in FIG. 12, the peripheral pixel amounts and the size of an input image (including peripheral pixels) are obtained from an output image size (an output band height and the like).

Components and steps having similar functions to those of the first exemplary embodiment will be designated by the same reference numerals. A description of structurally or functionally similar components or steps will be omitted.

In step S1201, the CPU 103 stores a set output image width (the band width obtained in step S1602) into the variable INIT_WIDTH.

In step S1202, the CPU 103 stores a set output image height (the output height obtained in step S1602) into the variable INIT_HEIGHT.

In step S1203, the CPU 103 stores the sum of the variables IN_WIDTH, IN_LEFT_REF, and IN_RIGHT_REF into the variable SET_IN_WIDTH.

In step S1204, the CPU 103 stores the sum of the variables IN_HEIGHT, IN_TOP_REF, and IN_BOTTOM_REF into the variable SET_IN_HEIGHT.

According to the present exemplary embodiment, the size of the input image including peripheral pixels can be determined from the output image size.

The first and second exemplary embodiments have been separately described for ease of description. However, the first and second exemplary embodiments may be implemented in combination. For example, in step S1601, when the CPU 103 determines the image processing mode, the CPU 103 may determine which to implement, the first exemplary embodiment or the second exemplary embodiment, based on the processing mode information in FIG. 18A.

The above-described exemplary embodiments deal with the cases where the ring bus 1400 is used to connect the plurality of processing modules A_201 to D_204 of the parallel processing unit 205. However, the plurality of processing modules A_201 to D_204 may be connected using an interconnect that can dynamically change the processing order among the image processing modules A_201 to D_204. For example, a crossbar switch or a switch matrix may be used. A plurality of selectors may be configured so that the processing order can be changed.

The above-described exemplary embodiments do not deal with a clipping processing module that performs clipping processing such as cropping and masking. Such processing is difficult to calculate an input amount in reverse order to the processing order. The processing module difficult to calculate an input amount in reverse order to the processing order may be arranged at the end of the processing order and excluded from the generation of the processing order table like FIG. 4, so that the processing module can be automatically skipped in the processing illustrated in FIG. 3 or FIG. 12. Note that the output band height corresponding to the processing order including the cropping processing can be set to a value prior to the execution of the cropping.

Although not described in detail in the above-described exemplary embodiments, the image processing modules may include a margin addition processing module for adding margin pixels. In such a case, the processing module for adding margin pixels is arranged at the top of the processing order. The CPU 103 sets the margin addition processing module after the peripheral pixel amounts are obtained in the processing in FIG. 3 or FIG. 12. The margin addition processing module outputs pixels (in fact, packets) including predetermined pixel values (for example, R=255, G=255, and B=255) at necessary positions.

The schematic block diagrams illustrating the components of the image processing apparatus used in the above-described exemplary embodiments are solely for the sake of describing the connections of the circuits and the functional units, and not intended to limit the positional relationship among the components.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-191434 filed Aug. 31, 2012, which is hereby incorporated by reference herein in its entirety.

What is claimed is:

1. A control apparatus that controls an image processing apparatus in which a plurality of image processing modules is connected by a bus in a ring shape and the plurality of image processing modules performs, on an input image, a series of image processes in a predetermined processing order to generate an output image, the control apparatus comprising:

a first obtaining unit configured to obtain a size of the output image that the image processing apparatus is caused to output;

a second obtaining unit configured to obtain the predetermined processing order in the series of the image processes and processing parameters for processing performed by, among the plurality of image processing modules, each of at least two image processing modules configured to perform the series of the image processes;

a calculation unit configured to calculate a number of pixels, required for outputting the size of the output image, according to the processing parameters and the predetermined processing order, wherein the calculation unit is configured to set an image processing module of interest, among the plurality of image processing modules performing the series of the image processes, in a reverse order to the predetermined processing order, and the calculation unit calculates the number of pixels required for the image processing module of interest using, as the size of an output image, the number of pixels required for an image processing module which performs processing after the image processing module of interest; and a determination unit configured to determine a size of the input image to be input to the image processing apparatus based on the number of pixels calculated by the calculation unit.

2. The control apparatus according to claim 1, further comprising a storage unit configured to store, for each of a plurality of processing modes executable by the image processing apparatus, a processing order in which each of at least two image processing modules among the plurality of image processing modules is caused to perform processing.

3. The control apparatus according to claim 2, wherein the storage unit is configured to store an algorithm for obtaining a peripheral pixel amount needed by each of the image processing modules, the peripheral pixel amount indicating the number of pixels to be added to a periphery of the image so that the control apparatus can process an image to be processed, and wherein the calculation unit is configured to obtain the number of pixels according to the processing parameters and the predetermined processing order by sequentially performing the algorithm corresponding to the image processing module in a reverse order to the processing order.

4. The control apparatus according to claim 3, wherein the peripheral pixel amount includes at least one of the number of pixels to be added to a top end of an image to be processed, the number of pixels to be added to a bottom end of the image to be processed, the number of pixels to be added to a left end of the image to be processed, the number of pixels to be added to a right end of the image to be processed, an image width including the added pixels, and an image height including the added pixels.

5. The control apparatus according to claim 2, wherein the storage unit is configured to store an algorithm for obtaining an output image size from an input image size for each of the image processing modules, and the calculation unit is configured to obtain a size of an output image by sequentially performing algorithms in such a way as to correspond to the image processing modules performed in the processing order.

6. The control apparatus according to claim 2, further comprising a control unit configured to control the image processing apparatus to operate in a plurality of processing modes.

7. The control apparatus according to claim 6, wherein the storage unit is configured to store a size of an input image to the image processing apparatus or a size of an output image from the image processing apparatus in each of the processing modes of the image processing apparatus.

8. The control apparatus according to claim 1, wherein the plurality of image processing modules is configured to include an enlargement processing module configured to perform enlargement processing on an input image.

9. The control apparatus according to claim 1, wherein the plurality of image processing modules is configured to include a reduction processing module configured to perform reduction processing on an input image.

10. The control apparatus according to claim 1, wherein, when a pixel of interest in the input image is processed, the plurality of image processing modules is configured to perform processing for outputting an output pixel value of the pixel of interest with reference to a plurality of pixels in the input image.

11. The control apparatus according to claim 1, wherein the plurality of image processing modules is configured to include a filter processing module configured to perform filter processing of N×M pixels.

12. The control apparatus according to claim 1, wherein the plurality of image processing modules is configured to include a tile processing module configured to perform tile processing of K×L pixels.

13. The control apparatus according to claim 1, wherein the plurality of image processing modules is configured to perform edge detection.

14. The control apparatus according to claim 1, wherein the plurality of image processing modules is configured to include a margin addition processing module configured to add a pixel having a predetermined pixel value.

15. The control apparatus according to claim 1, wherein the plurality of image processing modules is configured to include a clipping processing module configured to perform clipping processing.

16. The control apparatus according to claim 1, further comprising an input unit configured to supply an input image in the determined size to the image processing unit,
wherein the input unit is configured to supply an input image to which a peripheral pixel is added to the image processing apparatus by extending an address area to be supplied to the image processing apparatus.

17. The control apparatus according to claim 1, further comprising an input unit configured to supply an input image in the determined size to the image processing unit,
wherein the input unit is configured to supply an input image to which a peripheral pixel is added to the image processing apparatus by reading an address area to be supplied to the image processing apparatus a plurality of times.

18. The control apparatus according to claim 1, wherein the image processing apparatus is configured to include an interconnect configured to logically connect the plurality of image processing modules according to the processing order.

19. The control apparatus according to claim 1, wherein the predetermined processing order is different from a connection order in which each of the plurality of image processing modules is connected by the bus.

20. The control apparatus according to claim 1, wherein the calculation unit is configured to calculate the number of pixels according to the processing parameters and the predetermined processing order by sequentially calculating the number of pixels required, in a reverse order to the predetermined processing order.

21. The control apparatus according to claim 1, wherein the control apparatus is configured to determine a size of the input image before the image processing apparatus starts the series of the image processes.

22. A method of controlling an image processing apparatus in which a plurality of image processing modules is connected by a bus in a ring shape and the plurality of image processing modules performs, on an input image, a series of image processes in a predetermined processing order to generate an output image, the method comprising:
obtaining a size of the output image that the image processing apparatus is caused to output;
obtaining the predetermined processing order in the series of the image processes and processing parameters for processing performed by, among the plurality of image processing modules, each of at least two image processing modules configured to perform the series of the image processes;
performing a calculating step of calculating a number of pixels, required for outputting the size of the output image, according to the processing parameters and the predetermined processing order, wherein the calculating step sets an image processing module of interest, among the plurality of image processing modules performing the series of the image processes, in a reverse order to the predetermined processing order, and the calculating step calculates the number of pixels required for the image processing module of interest using, as the size of an output image, the number of pixels required for an image processing module which performs processing after the image processing module of interest; and
determining a size of the input image to be input to the image processing apparatus based on the number of pixels calculated by the calculating.

23. A non-transitory computer-readable medium that stores a program of instructions that when executed by a computer causes the computer to perform a method of controlling an image processing apparatus, the image processing apparatus having a plurality of image processing modules connected by a bus in a ring shape, the plurality of image processing modules performing, on an input image, a series of image processes in a predetermined processing order to generate an output image, the method comprising:
obtaining a size of the output image that the image processing apparatus is caused to output;
obtaining the predetermined processing order in the series of the image processes and processing parameters for processing performed by, among the plurality of image processing modules, each of at least two image processing modules configured to perform the series of the image processes;
performing a calculating step of calculating a number of pixels, required for outputting the size of the output image, according to the processing parameters and the predetermined processing order, wherein the calculating step sets an image processing module of interest, among the plurality of image processing modules performing the series of the image processes, in a reverse order to the predetermined processing order, and the calculating step calculates the number of pixels required for the image processing module of interest using, as the size of an output image, the number of pixels required for an image processing module which performs processing after the image processing module of interest; and determining a size of the input image to be input to the image processing apparatus based on the number of pixels calculated by the calculating.

24. A control apparatus that controls an image processing unit in which a plurality of image processing modules performs, on an input image, a series of image processes in a predetermined logical processing order to generate an output image, the control apparatus comprising:

a first obtaining unit configured to obtain a size of the output image that the image processing apparatus is caused to output;

a second obtaining unit configured to obtain the predetermined processing order in the series of the image processes and processing parameters for processing performed by, among the plurality of image processing modules, each of at least two image processing modules configured to perform the series of the image processes;

a calculation unit configured to calculate a number of pixels, required for outputting the size of the output image, according to the processing parameters and the predetermined processing order, wherein the calculation unit is configured to set an image processing module of interest, among the plurality of image processing modules performing the series of the image processes, in a reverse order to the predetermined processing order, and the calculation unit calculates the number of pixels required for the image processing module of interest using, as the size of an output image, the number of pixels required for an image processing module which performs processing after the image processing module of interest; and a determination unit configured to determine a size of the input image to be input to the image processing apparatus based on the number of pixels calculated by the calculation unit.

25. A method of controlling an image processing unit, the image processing unit having a plurality of image processing modules that performs, on an input image, a series of image processes in a predetermined logical processing order to generate an output image, the method comprising:

obtaining a size of the output image that the image processing apparatus is caused to output;

obtaining the predetermined processing order in the series of the image processes and processing parameters for processing performed by, among the plurality of image processing modules, each of at least two image processing modules configured to perform the series of the image processes;

performing a calculating step of calculating a number of pixels, required for outputting the size of the output image, according to the processing parameters and the predetermined processing order, wherein the calculating step sets an image processing module of interest, among the plurality of image processing modules performing the series of the image processes, in a reverse order to the predetermined processing order, and the calculating step calculates the number of pixels required for the image processing module of interest using, as the size of an output image, the number of pixels required for an image processing module which performs processing after the image processing module of interest; and determining a size of the input image to be input to the image processing apparatus based on the number of pixels calculated by the calculation unit.

26. A control apparatus that controls an image processing apparatus in which a plurality of image processing modules is connected by a bus in a ring shape and the plurality of image processing modules performs, on an input image, a series of image processes in a predetermined processing order to generate an output image, the control apparatus comprising:

a first obtaining unit configured to obtain a size of the output image that the image processing apparatus is caused to output;

a second obtaining unit configured to obtain the predetermined processing order in the series of the image processes and processing parameters for processing performed by, among the plurality of image processing modules, each of at least two image processing modules configured to perform the series of the image processes;

a determination unit configured to determine a number of pixels, required for outputting the size of the output image, according to the processing parameters and the predetermined processing order, and a size of the input image to be input to the image processing apparatus based on the number of pixels wherein the determination unit is configured to set an image processing module of interest, among the plurality of image processing modules performing the series of the image processes, in a reverse order to the predetermined processing order, and the determination unit calculates the number of pixels required for the image processing module of interest using, as the size of an output image, the number of pixels required for an image processing module which performs processing after the image processing module of interest.

27. The control apparatus according to claim 26, further comprising a storage unit configured to store, for each of a plurality of processing modes executable by the image processing apparatus, a processing order in which each of at least two image processing modules among the plurality of image processing modules is caused to perform processing.

28. The control apparatus according to claim 27,
wherein the storage unit is configured to store an algorithm for obtaining a peripheral pixel amount needed by each of the image processing modules, the peripheral pixel amount indicating the number of pixels to be added to a periphery of the image so that the control apparatus can process an image to be processed, and
wherein the determination unit is configured to obtain the number of pixels according to the processing parameters and the predetermined processing order by sequentially performing the algorithm corresponding to the image processing module in a reverse order to the processing order.

29. The control apparatus according to claim 28, wherein the peripheral pixel amount includes at least one of the number of pixels to be added to a top end of an image to be processed, the number of pixels to be added to a bottom end of the image to be processed, the number of pixels to be added to a left end of the image to be processed, the number of pixels to be added to a right end of the image to be processed, an image width including the added pixels, and an image height including the added pixels.

30. The control apparatus according to claim 26, further comprising an input unit configured to supply an input image in the determined size to the image processing unit,
wherein the input unit is configured to supply an input image to which a peripheral pixel is added to the image processing apparatus by reading an address area to be supplied to the image processing apparatus a plurality of times.

31. A method of controlling an image processing apparatus in which a plurality of image processing modules is connected by a bus in a ring shape and the plurality of image processing modules performs, on an input image, a series of image processes in a predetermined processing order to generate an output image, the method comprising:
obtaining a size of the output image that the image processing apparatus is caused to output;
obtaining the predetermined processing order in the series of the image processes and processing parameters for processing performed by, among the plurality of image processing modules, each of at least two image processing modules configured to perform the series of the image processes;
determining a number of pixels, required for outputting the size of the output image, according to the processing parameters and the predetermined processing order, and a size of the input image to be input to the image processing apparatus based on the number of pixels wherein the determining sets an image processing module of interest, among the plurality of image processing modules performing the series of the image processes, in a reverse order to the predetermined processing order, and the determining calculates the number of pixels required for the image processing module of interest using, as the size of an output image, the number of pixels required for an image processing module which performs processing after the image processing module of interest.

32. A non-transitory computer-readable medium that stores a program of instructions that when executed by a computer causes the computer to perform a method of controlling an image processing apparatus, the image processing apparatus having a plurality of image processing modules connected by a bus in a ring shape, the plurality of image processing modules performing, on an input image, a series of image processes in a predetermined processing order to generate an output image, the method comprising:
obtaining a size of the output image that the image processing apparatus is caused to output;
obtaining the predetermined processing order in the series of the image processes and processing parameters for processing performed by, among the plurality of image processing modules, each of at least two image processing modules configured to perform the series of the image processes;
determining a number of pixels, required for outputting the size of the output image, according to the processing parameters and the predetermined processing order, and a size of the input image to be input to the image processing apparatus based on the number of pixels wherein the determining sets an image processing module of interest, among the plurality of image processing modules performing the series of the image processes, in a reverse order to the predetermined processing order, and the determining calculates the number of pixels required for the image processing module of interest using, as the size of an output image, the number of pixels required for an image processing module which performs processing after the image processing module of interest.

* * * * *